(12) United States Patent
Liao et al.

(10) Patent No.: US 11,979,926 B2
(45) Date of Patent: May 7, 2024

(54) SYSTEMS, METHODS, AND APPARATUSES FOR ENABLING RELAY SERVICES FOR USER EQUIPMENT TO ACCESS 5GC VIA A RESIDENTIAL GATEWAY

(71) Applicant: APPLE INC., Cupertino, CA (US)

(72) Inventors: Ching-Yu Liao, Portland, OR (US); Meghashree Dattatri Kedalagudde, Portland, OR (US); Alexandre Saso Stojanovski, Paris (FR)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/177,869

(22) Filed: Mar. 3, 2023

(65) Prior Publication Data

US 2023/0209656 A1 Jun. 29, 2023

Related U.S. Application Data

(62) Division of application No. 17/280,987, filed as application No. PCT/US2019/054302 on Oct. 2, 2019.

(Continued)

(51) Int. Cl.
*H04W 8/02* (2009.01)
*H04W 12/06* (2021.01)
(Continued)

(52) U.S. Cl.
CPC .............. *H04W 76/11* (2018.02); *H04W 8/02* (2013.01); *H04W 12/06* (2013.01); *H04W 28/0247* (2013.01); *H04W 28/0268* (2013.01); *H04W 28/09* (2020.05); *H04W 28/10* (2013.01); *H04W 48/16* (2013.01); *H04W 60/00* (2013.01); *H04W 76/12* (2018.02); *H04W 76/15* (2018.02);
(Continued)

(58) Field of Classification Search
CPC ... H04W 8/005–30; H04W 12/009–80; H04W 28/02–26; H04W 36/0005–385; H04W 40/005–38; H04W 48/02–20; H04W 60/00–06; H04W 74/002–0891; H04W 76/10–50; H04W 80/02–12; H04W 84/005–22; H04W 88/005–188; H04W 92/02–24
See application file for complete search history.

(56) References Cited

U.S. PATENT DOCUMENTS

2010/0138900 A1 6/2010 Peterka et al.
2011/0103310 A1 5/2011 Stojanovski et al.
(Continued)

OTHER PUBLICATIONS

Intel, "Solution of 5GC Capable UE behind 5G-RG connected to 5GC via NG-RAN/W-5GAN", S2-188141, SA WG2 Meeting #S2-128Bis, Sophia Antipolis, France. Agenda Item 6.7, Aug. 20-24, 2018, 7 pages (Year: 2018).*

(Continued)

*Primary Examiner* — Timothy J Weidner
(74) *Attorney, Agent, or Firm* — Dorsey & Whitney LLP

(57) ABSTRACT

Relay service is enabled between a residential gateway and a remote user. For example, a 5G residential gateway (5G-RG) may include a relay user equipment (UE) to enable relay service for a 5G core (5GC)-capable UE behind the 5G-RG to connect to the 5GC. The relay UE of the 5G-RG may provide a trusted/untrusted non-3GPP access network for L2 or L3 transport connection to the 5GC-capable UE.

20 Claims, 14 Drawing Sheets

Related U.S. Application Data

(60) Provisional application No. 62/740,859, filed on Oct. 3, 2018.

(51) Int. Cl.

| | | |
|---|---|---|
| *H04W 28/02* | (2009.01) | |
| *H04W 28/08* | (2023.01) | |
| *H04W 28/10* | (2009.01) | |
| *H04W 48/16* | (2009.01) | |
| *H04W 60/00* | (2009.01) | |
| *H04W 76/11* | (2018.01) | |
| *H04W 76/12* | (2018.01) | |
| *H04W 76/15* | (2018.01) | |
| *H04W 76/22* | (2018.01) | |
| *H04W 76/25* | (2018.01) | |
| *H04W 80/02* | (2009.01) | |
| *H04W 80/04* | (2009.01) | |
| *H04W 80/06* | (2009.01) | |
| *H04W 80/08* | (2009.01) | |
| *H04W 84/04* | (2009.01) | |
| *H04W 84/12* | (2009.01) | |
| *H04W 88/00* | (2009.01) | |
| *H04W 88/04* | (2009.01) | |
| *H04W 88/08* | (2009.01) | |
| *H04W 88/14* | (2009.01) | |
| *H04W 88/16* | (2009.01) | |
| *H04W 88/18* | (2009.01) | |
| *H04W 92/02* | (2009.01) | |
| *H04W 92/04* | (2009.01) | |
| *H04W 92/06* | (2009.01) | |
| *H04W 92/10* | (2009.01) | |
| *H04W 92/18* | (2009.01) | |
| *H04W 92/24* | (2009.01) | |

(52) U.S. Cl.
CPC ........... *H04W 76/22* (2018.02); *H04W 76/25* (2018.02); *H04W 80/02* (2013.01); *H04W 80/04* (2013.01); *H04W 80/06* (2013.01); *H04W 80/08* (2013.01); *H04W 84/042* (2013.01); *H04W 84/12* (2013.01); *H04W 88/005* (2013.01); *H04W 88/04* (2013.01); *H04W 88/08* (2013.01); *H04W 88/14* (2013.01); *H04W 88/16* (2013.01); *H04W 88/18* (2013.01); *H04W 92/02* (2013.01); *H04W 92/045* (2013.01); *H04W 92/06* (2013.01); *H04W 92/10* (2013.01); *H04W 92/18* (2013.01); *H04W 92/24* (2013.01)

(56) References Cited

U.S. PATENT DOCUMENTS

| | | |
|---|---|---|
| 2021/0076301 A1* | 3/2021 | Yu .......................... H04W 48/02 |
| 2022/0377819 A1 | 11/2022 | Zhou et al. |
| 2022/0393972 A1 | 12/2022 | Salkintzis |

OTHER PUBLICATIONS

3GPP TS 23.502, "3rd Generation Partnership Project; Technical Specification Group Services and System Aspects; Procedures for the 5G System; Stage 2 (Release 15)", V15.3.0, Sep. 1, 2018, 330 pages (Year: 2018).*
U.S. Appl. No. 17/280,987, Final Office Action, Jul. 21, 2023, 14 pages.
U.S. Appl. No. 17/280,987, Notice of Allowance, Oct. 16, 2023, 5 pages.
3GPP TS 23.502 , "3rd Generation Partnership Project; Technical Specification Group Services and System Aspects; Procedures for the 5G System; Stage 2 (Release 15)", V15.3.0, Sep. 1, 2018, 330 pages.
Ericsson , "Requirements for 3GPP end user devices via 5G-RG/FN-RG", S2-183232, SA WG2 Meeting #127, Sanya, China, Agenda Item 6.7 (revision of S2-18xxxx), Apr. 16-20, 2018, 4 pages.
Intel , "Solution of 5GC Capable UE behind 5G-RG connected to 5GC via NG-RAN/W-5GAN", S2-188141, SA WG2 Meeting #S2-128Bis, Sophia Antipolis, France. Agenda Item 6.7, Aug. 20-24, 2018, 7 pages.
PCT/US2019/054302 , International Search Report and Written Opinion, Jan. 16, 2020, 13 pages.
U.S. Appl. No. 17/280,987, Non-Final Office Action, 13 pages, Apr. 14, 2023.

* cited by examiner

SYSTEMS, METHODS, AND APPARATUSES FOR ENABLING RELAY SERVICES FOR USER EQUIPMENT TO ACCESS 5GC VIA A RESIDENTIAL GATEWAY

CROSS-REFERENCE TO RELATED APPLICATIONS

This application is a divisional of U.S. Non-Provisional application Ser. No. 17/280,987, filed Mar. 29, 2021, which is a national stage filing under 35 U.S.C. § 371 of International Patent Application No. PCT/US2019/054302, filed Oct. 2, 2019 which claims the benefit of U.S. Provisional Application No. 62/740,859, filed Oct. 3, 2018, each of which is hereby incorporated by reference herein in its entirety.

TECHNICAL BACKGROUND

This application relates generally to wireless communication systems, and more specifically to relay services provided by a residential gateway.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

DETAILED DESCRIPTION

The subject of 5G Wireless and Wireline Convergence (5G WWC) is currently under study in 3GPP. This disclosure provides approaches for the issues addressed in such studies on wireless and wireline convergence for the 5G system architecture. For example, a 5G residential gateway (5G-RG) may need to be able to accommodate user devices with or without universal integrated circuit card (UICC) credential and/or 3GPP capabilities, which is behind the 5G-RG, to access a NG or 5G core network (5GC) via a 5G RAN node. However, various issues remain open, such as: how the network is to identify user devices behind the 5G-RG, how the network is to identify the traffic communicated with the user device behind the 5G-RG, and how the network and the 5G-RG are to forward the traffic communicated with the user device behind the 5G-RG.

Under an architecture assumption that a single access and mobility management function (AMF), session management function (SMF), user plane function (UPF), or policy control function (PCF) are used by both 5G-RG and 5GC capable UE behind the 5G-RG, certain embodiments provide approaches to the abovementioned open issues by enabling the 5G-RG as a relay UE to relay traffic for remote UEs, which may be user devices with/without UICC.

Certain embodiments disclosed herein consider whether and how a UE capable of accessing a cellular network (e.g., a 5GC capable UE) and a residential gateway (e.g., a 5G-RG or other gateway such as a 6G-RG) use the same or different AMFs and UPFs. If the AMFs and/or UPFs are the same, certain embodiments describe how selection of a common AMF or common UPF is achieved (especially, e.g., during mobility scenarios from 3GPP access and when the 5G-RG is supporting multiple 5GC capable UEs).

Figure 1:
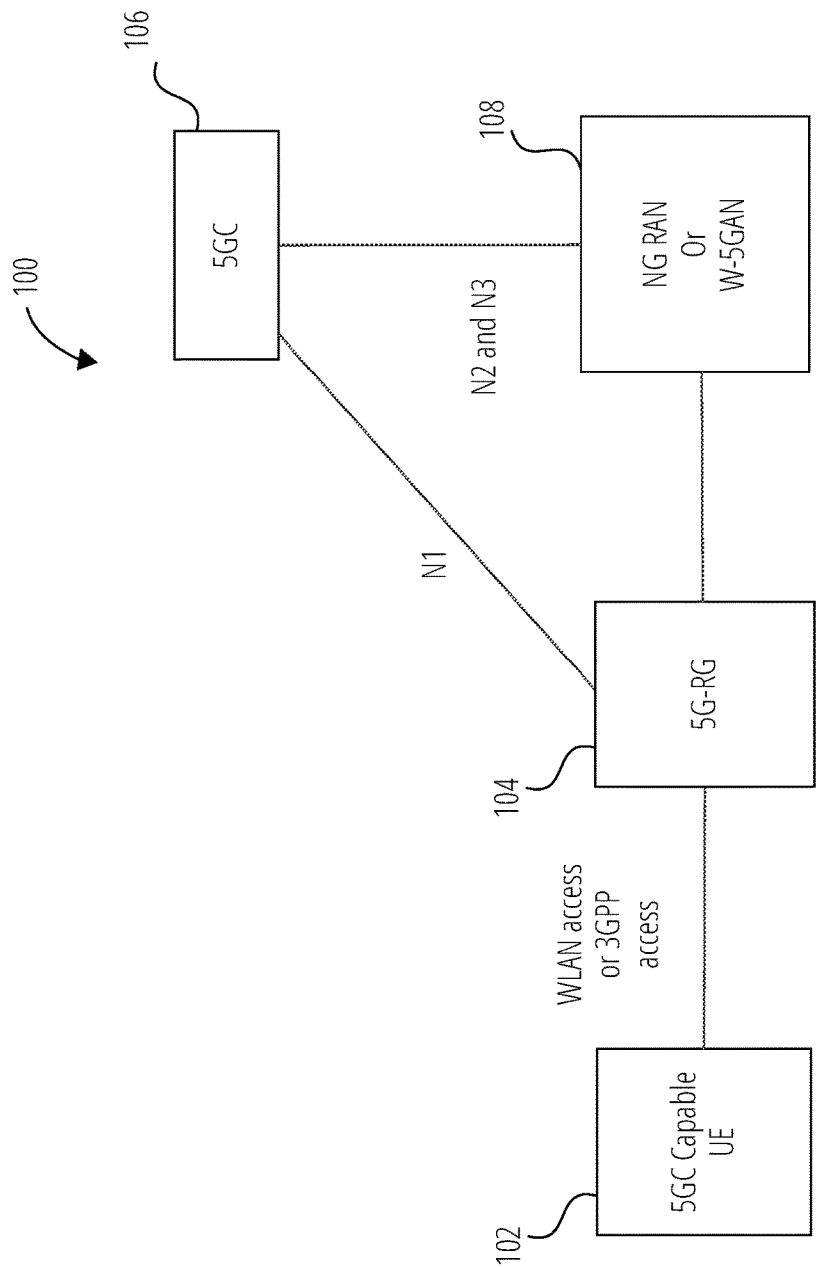
FIG. 1 illustrates an example scenario in accordance with one embodiment.
Figure 2:
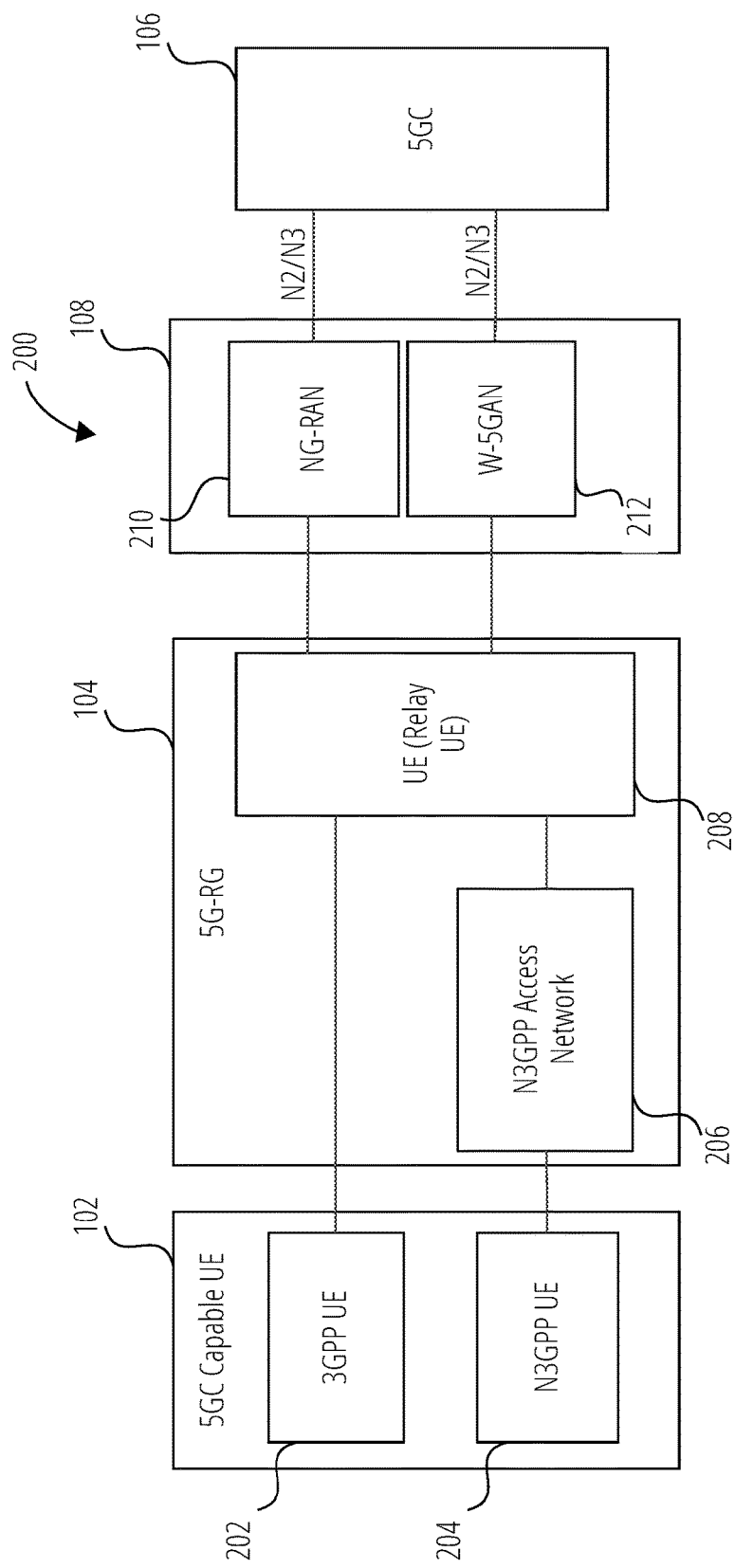
FIG. 2 illustrates an additional details of the example shown in FIG. 1 in accordance with one embodiment.

Certain embodiments of the present disclosure provide approaches that consider a scenario that 5GC-capable UE (i.e., 3GPP) behind the 5G-RG connected to a 5GC via next generation RAN (NG-RAN) and/or a wireline 5G access network (W-5GAN) can access to 5G-RG via wireless local area network (WLAN) access or 3GPP access, as shown in FIG. 1 and FIG. 2. While certain examples herein are directed to 3GPP and 5G embodiments, persons skilled in the art will recognize from the disclosure herein that other cellular networks, non-cellular networks (e.g., Wi-Fi or other WLAN and non-3GPP networks), or other versions or generations (e.g., 6G).

FIG. 1 illustrates an example scenario 100 for a 5GC capable UE 102 behind a 5G-RG 104 connected to a 5GC 106 via an NG RAN or W-5GAN 108. In this example, the 5GC capable UE 102 accesses to the 5G-RG 104 via 3GPP and/or non-3GPP access (e.g., WLAN). The 5GC capable UE 102 may also be referred to herein as a remote UE. As discussed below, the 5G-RG 104 uses an N1 reference point to connect to the 5GC 106. As shown, the NG RAN or W-5GAN 108 may use N2 and N3 reference points to connect to the 5GC 106.

FIG. 2 illustrates additional details 200 of the 5GC capable UE 102, the 5G-RG 104, and the NG RAN or W-5GAN 108 shown in FIG. 1 according to one embodiment. The 5GC capable UE 102 may include a 3GPP UE 202 and a non-3GPP UE (shown as N3GPP UE 204). The 3GPP UE 202 may be configured to access the 5GC 106 directly through an N1 connection and/or through the 5G-RG 104. The N3GPP UE 204 may be configured to access a WLAN network.

The 5G-RG 104 may be a residential gateway capable of connecting to the 5GC 106 playing the role of a UE with regard to the 5G core. The 5G-RG 104 may support secure element and exchanges N1 signaling with the 5GC 106. The 5G-RG 104 may include a N3GPP access network 206 and a UE (shown as a relay UE 208). The N3GPP access network 206 may be an access network that is not defined by 3GPP, such as Wi-Fi or another WLAN.

The NG RAN or W-5GAN 108 may include one or both of an NG-RAN 210 and a W-5GAN 212. The NG-RAN 210 may connect to the 5GC 106 via N2 and N3 reference points. The W-5GAN 212 may be a wireline access network (AN) that connect to the 5GC 106 via N2 and N3 reference points. A wireline AN may provide, for example, an optical or electrical connection. The W-5GAN 212 may also be a wireline 5G cable access network. In certain embodiments, the W-5GAN 212 is non-3GPP access network.

The evolved packet system (EPS) can provide proximity service (ProSe) using ProSe UE-to-network relay to relay traffic of remote UEs for public safety. However, the ProSe features are not supported in 5GS and it is still in question how the 5G-RG can act as relay UE for remote UEs requiring general services, e.g. internet, etc.

In current 5GS specifications, there is no relay functionalities supported for the 5G UE. It is in question, for example, how the 5GS accommodates a user device with/ without UICC behind a 5G-RG (residential gateway) acting as a relay UE.

In the 5G WWC, there may be related solutions for resolving certain issues related to identifying a 5GC-capable UE behind the 5G-RG. The embodiments discussed herein are different from the existing solutions in various aspects. For example, in certain embodiments disclosed herein the 5GC-capable UE uses untrusted/trusted non-3GPP access to connect a non-3GPP (N3GPP) access network (N3GPP-AN) in the 5G-RG. The N3GPP-AN in the 5G-RG can support layer 2 (L2) and/or layer 3 (L3) transport connection using untrusted/trusted N3GPP accesses, respectively. Further, the N3GPP-AN and relay UE are back-to-back functions and the connection between them may be up to UE implementation. From the N3GPP-AN point of view, it connects to 5GC using wireless/wireline backhaul provided by the connection between relay UE and the NG-RAN/W-5GAN. The 5G-RG also includes a relay UE using its N1 connection to relay N1 message for the remote UE and to manage one or more protocol data unit (PDU) sessions to relay traffic of the remote UEs. That is, a PDU session may be shared by the traffic of one or more remote UEs. The 5G-RG may report remote UE status to make the remote UE visible to the 5GC. Further, the communications between 5GC and remote UE may be visible and handled by the 5G-RG (in-transparent).

Previous solutions may lack relay functionalities and the 5G core may not be able to identify a user device with or without UICC and 3GPP capabilities behind a 5G-RG, or identify the relayed traffic sent by user devices with or without UICC behind a 5G-RG. Further, certain existing solutions do not provide for the 5G-RG using 3GPP access to connect to the 5GC via NG-RAN. Certain embodiments disclosed herein are different from prior solutions 5G WWC for at least the following reasons: the 5G-RG relays non-access stratum (NAS) messages of the remote UE based on solutions of trusted/untrusted N3GPP procedure, i.e., the NAS messages of the remote UE are relayed based on control plane solutions; each individual remote UE may establish a PDU session for its traffic; the communication between the 5GC and the remote UE may be transparent; and/or support may be provided for 5G-RG and/or fixed network residential gateway (FN-RG) connected to the 5GC via the W-5GAN. Further, prior solutions may not provide support of 5G-RG using 3GPP access connections to 5GC via NG-RAN.

Certain embodiments discussed herein are different from other prior solutions in 5G WWC for at least the following reasons: the remote UE may discover 5G-RG and W-5GAN separately and may performs untrusted N3GPP registration/ PDU session establishment procedures to 5GC via W-5GAN; each individual remote UE may establish a PDU session for its traffic; an established PDU session may be used to relay NAS messages of the remote UE, including both a registration request and PDU session establishment request message, over the user plane between the 5G-RG and the W-5GAN; and/or the communication between the 5GC and the remote UE may be transparent; support may be provided for the 5G-RG connected to the 5GC via the W-5GAN.

Certain embodiments herein provide support of AMF discovery and selection functions for relocate different AMF for 5GC-capable UEs, support of multiple PDU sessions for respective 5G-RG and 5GC-capable UEs when the AMF of the 5GC-capable UE is different from the AMF of the 5G-RG, and/or support of multiple N2/N3 at the NG-RAN/ W-5GAN for the 5G-RG and the 5GC-capable UEs.

Various embodiments herein provide support of multiple AMF/SMF/UPF for 5G-RG and 5GC-capable UEs.

A. Example Embodiment of 5GC-Capable UE Behind a 5G-RG Connected to a 5GC Via NG-RAN/W-5GAN In certain embodiments, a 5GC-capable UE behind the 5G-RG can access to 5G-RG via untrusted/trusted non-3GPP access (N3GPP UE) or 3GPP access (3GPP UE), and the 5G-RG connects to 5GC via NG-RAN/W-5GAN.

For the case that the 5GC-capable UE connects to 5G-RG via 3GPP access, a similar solution of ProSe UE-to-network relay as defined in clause 5.4.4 of 3GPP TS 23.303 may be applied for 5G-RG. Note that the device to device direct communication/discovery between a 5GC-capable device using 3GPP access and a 5G-RG may not be supported yet in 5GS.

For the case that the 5GC-capable UE connects to the 5G-RG via N3GPP access, the 5GC-capable UE and the 5G-RG may establish L2/L3 transport connection and the 5G-RG relay NAS message and user plane traffic to the 5GC. Certain embodiments herein focus on the latter case.

B. Example Architectures

In one embodiment, the 5G-RG comprises an AN function to provide L2/L3 connectivity via untrusted/trusted Non-3GPP access, respectively, for the 5GC-capable UE behind 5G-RG and relay UE function to manage N1 connection and PDU sessions with the 5GC for connected 5GC-capable UEs.

Figure 3:
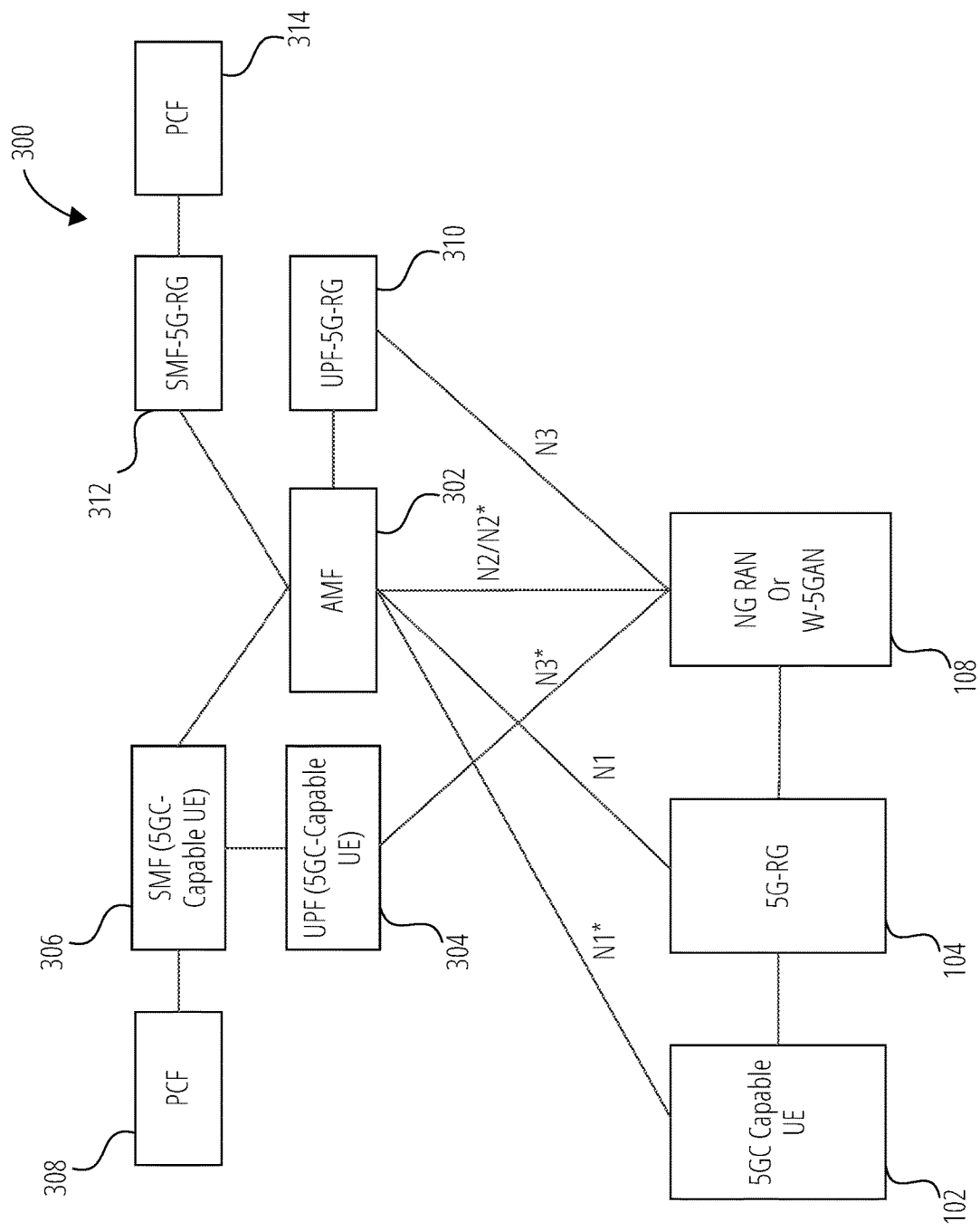
FIG. 3 illustrates an example architecture in accordance with one embodiment.

For example, FIG. 3 illustrates an example architecture 300 according to one embodiment to allow a 5GC capable UE 102 access to a 5GC via a 5G-RG 104, wherein the 5G-RG 104 connects to the 5GC via an NG RAN or W-5GAN 108. In this example, the same AMF 302 selects different SMFs/UPFs for accommodating traffic flows from the 5G-RG 104 and the 5GC capable UE 102.

The example architecture 300 supports the same AMF 302 being selected by the NG RAN or W-5GAN 108 to handle the registrations for both of 5G-RG 104 and the 5GC capable UE 102. In the meantime, the AMF 302 may select different SMF/UPF to manage PDU sessions for the 5G-RG 104 and the 5GC capable UE 102, respectively. For example, the AMF 302 may select a UPF-5G-RG 310 and an SMF-5G-RG 312 with a corresponding PCF 314 to manage PDU sessions for the 5G-RG 104, and the AMF 302 may select a UPF 304 and an SMF 306 with a corresponding PCF 308 to manage PDU sessions for the 5GC capable UE 102.

Figure 4:
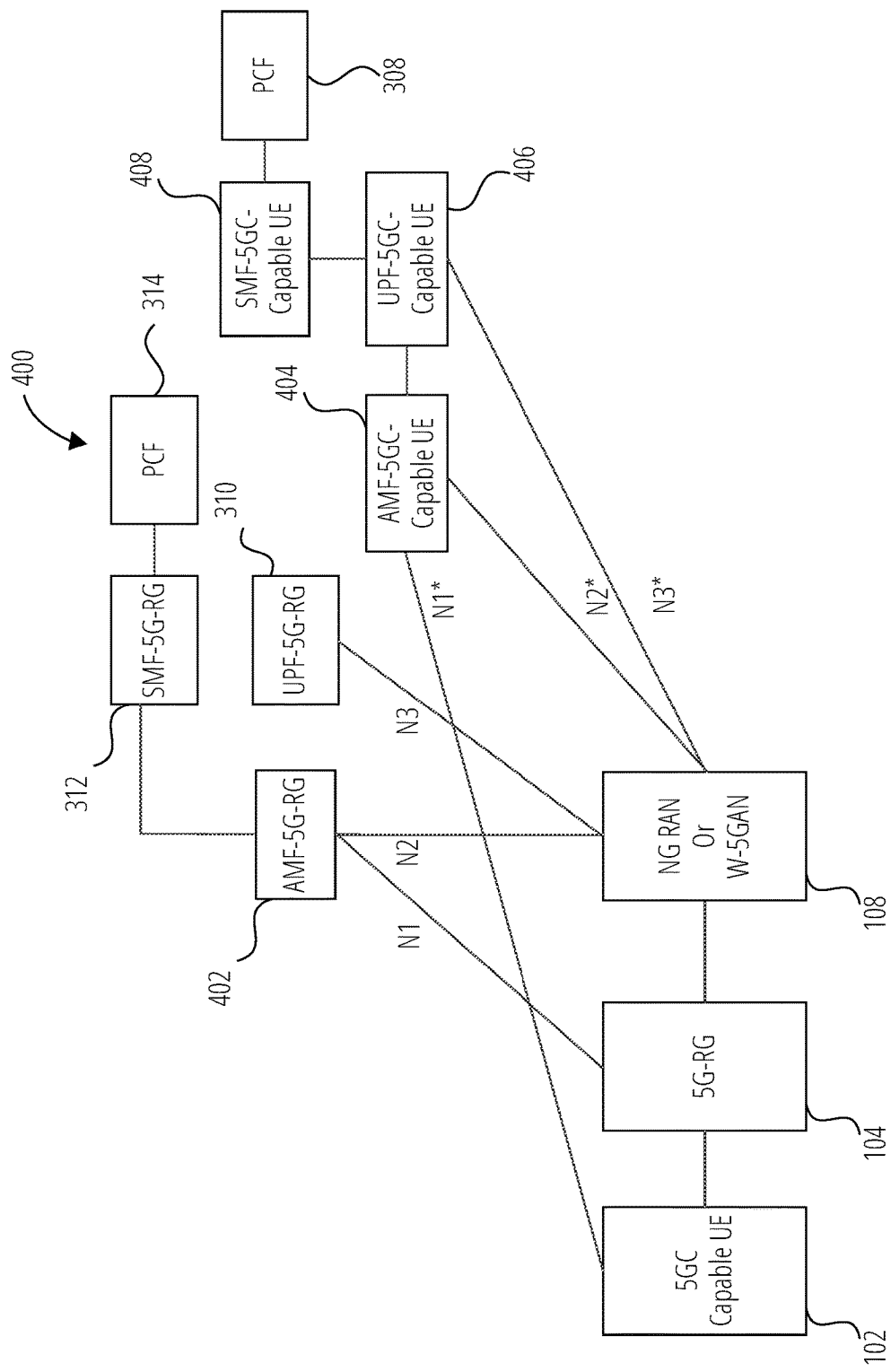
FIG. 4 illustrates another example architecture in accordance with one embodiment.

FIG. 4 illustrates another example architecture 400 according to one embodiment to allow a 5GC capable UE 102 access to the 5GC via the 5G-RG 104, wherein the 5G-RG 104 connects to the 5GC via the NG RAN or W-5GAN 108. In this example, different AMFs/SMFs/UPFs are selected for accommodating traffic flows from the 5G-RG 104 and the 5GC capable UE 102.

The example architecture 400 supports different AMFs, indicated as AMF-5G-RG 402 and AMF-5GC-capable UE 404, to handle the registrations for the 5G-RG 104 and the 5GC capable UE 102, respectively. In the meantime, each AMF may select different SMF/UPF to manage PDU sessions for the 5G-RG 104 and the 5GC capable UE 102, respectively. For example, the AMF-5G-RG 402 may select the UPF-5G-RG 310 and SMF-5G-RG 312 with corresponding PCF 314 to manage PDU sessions for the 5G-RG 104. Similarly, the AMF-5GC-capable UE 404 may select the UPF-5GC-capable UE 406 and SMF-5GC-capable UE 408 with corresponding PCF 308 to manage PDU sessions for the 5GC capable UE 102.

In FIG. 3 and FIG. 4, reference points N1, N2, N3, N1*, N2*, and N3* are shown. The asterisks of N1*/N2*/N3* represent the reference points for the 5GC capable UE 102. In certain embodiments, the 5GC capable UE 102 may access the 5GC via the NG-RAN directly and via the 5G-RG 104, simultaneously. In such embodiments, a common AMF may be selected for the 5GC capable UE 102.

C. Example Functions at the 5G-RG

From a functional point of view, a 5G-RG may include two types of functions. A first type of function may provide L2/L3 connectivity via untrusted/trusted Non-3GPP access, respectively, for the 5GC-capable UE behind the 5G-RG. A second type of function may maintain the N1 connection and manage PDU sessions with the 5GC and relay traffic between the 5GC-capable UE and the 5GC.

Figure 5:
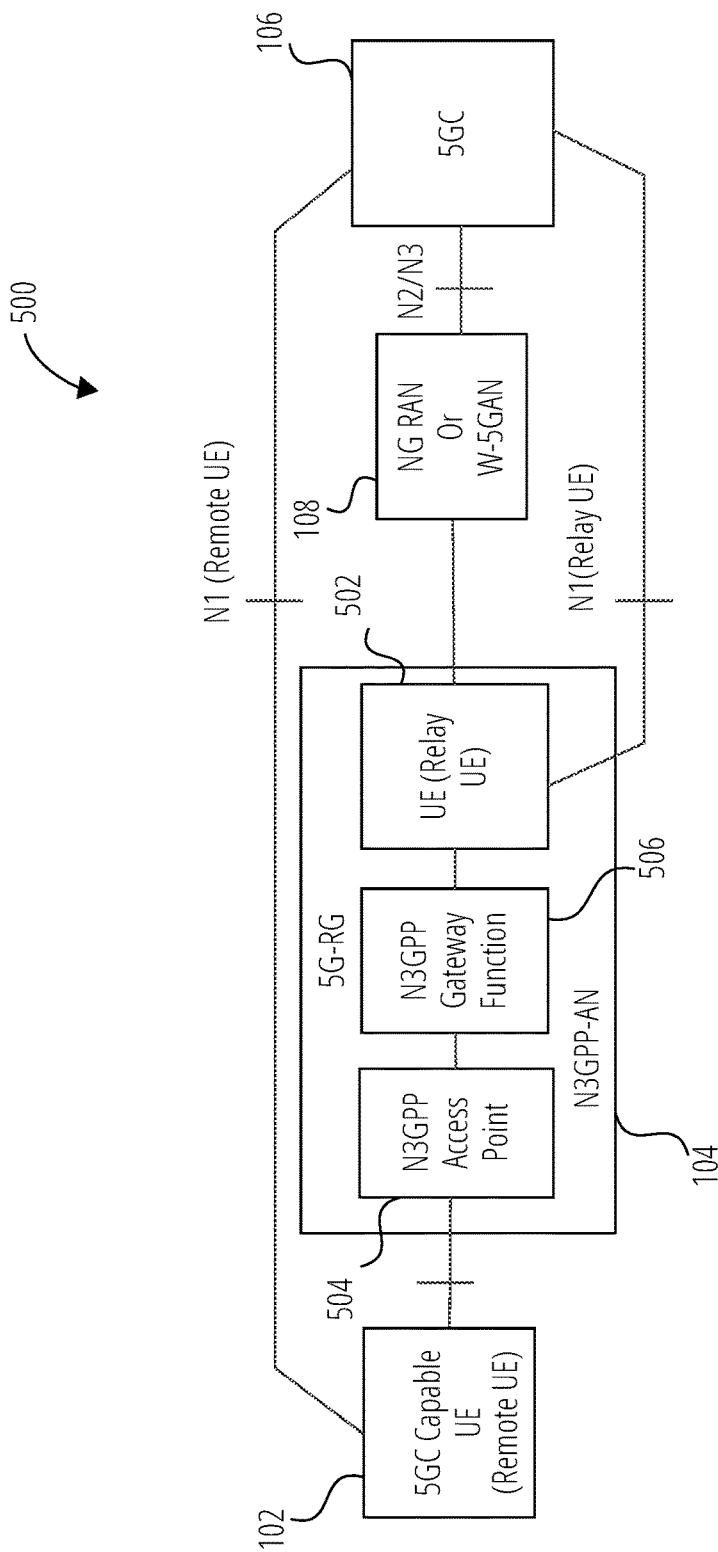
FIG. 5 illustrates 5G-RG functions in accordance with one embodiment.

For example, FIG. 5 illustrates 5G-RG functions 500 with an untrusted/trusted n3GPP access network (N3GPP-AN) and a UE or relay UE 502 according to one embodiment. The N3GPP-AN includes a N3GPP access point 504 and a N3GPP gateway function 506. As shown in FIG. 5, the 5G-RG 104 may function as the relay UE 502 for both of the N1 messages and data traffic from the 5GC capable UE 102 to the 5GC 106 via the NG RAN or W-5GAN 108 by using its established N1 connection as well as PDU sessions, respectively.

The 5GC capable UE 102 may use untrusted/trusted non-3GPP access to connect the N3GPP-AN in the 5G-RG 104. The N3GPP-AN can support L2/L3 transport connection using untrusted/trusted N3GPP accesses, respectively.

The N3GPP-AN and the relay UE 502 may be back-to-back functions and the connection between them may be based on UE implementation. From the N3GPP-AN point of view, the N3GPP-AN connects to the 5GC 106 using a wireless/wireline backhaul provided by the connection between the relay UE 502 and the NG RAN or W-5GAN 108.

The relay UE 502 in the 5G-RG 104 may be an L3 relay supporting N1 connection via 3GPP access or non-3GPP access. The relay UE 502 relays both N1 control plane messages and user plane traffic of the remote UE using its established N1 connection and PDU sessions by piggybacking the N1 message and carrying quality of service (QoS) flow of the remote UE. This is to reflect the fact that the N1 connection of the 5GC capable UE 102 relies on the N1 connection of the relay UE 502 to the 5GC 106 as a wireless/wireline backhaul via the NG RAN or W-5GAN 108, respectively.

The relay UE 502 may relay and steer user plane traffic of the remote UEs between 3GPP access and non-3GPP access based on access traffic steering, switching and splitting (ATSSS) policies.

The relay UE 502 may also report status of remote UEs to the 5GC 106, i.e., the traffic transport between the 5GC capable UE 102 and the 5GC 106 may not be transparent to the relay UE 502. As such, the 5GC 106 can identify the 5GC capable UE 102 behind the 5G-RG 104 and its traffic.

From the 5GC-capable UE point of view, the 5GC capable UE 102 regards the 5G-RG 104 as an untrusted/trusted N3GPP access network and uses the corresponding untrusted/trusted N3GPP registration procedure and PDU session management procedures. If hybrid access is supported at the 5GC capable UE 102, it can apply the ATSSS policies for hybrid accesses with the 3GPP access to the NG-RAN and N3GPP access to the 5G-RG 104.

D. Untrusted/Trusted N3GPP Access Between 5GC-Capable UE and 5G-RG

In one embodiment, for accessing untrusted N3GPP-AN in the 5G-RG 104, the 5GC capable UE 102 performs 5G-RG discovery (e.g., based on 3GPP TS 23.501, clause 6.3.6.2). The 5GC capable UE 102 may follow 3GPP TS 23.502, clause 4.12.2.2 (step 1-step 3) for performing WLAN association with the N3GPP-AP, establishing L3 transport connection with the N3GPP-AP and initiating internet key exchange (IKE) security association (SA), as well as requesting IKE authentication with the N3GPP gateway function 506 (N3GPP-GF). In certain such embodiments, the N3GPP-GF (similar to non-3GPP inter-working function (N3IWF) but without the support of N2/N3) supports IKE for security association and triggers 5G-START using IKE/extensible authentication protocol (EAP) to the 5GC capable UE 102 (e.g., as in 3GPP TS 23.502, clause 4.12.2.2 (step 4)).

In one embodiment, for accessing trusted N3GPP-AN in the 5G-RG 104, the 5GC capable UE 102 discovers and selects the N3GPP-AN (e.g., based on 3GPP TR 23.716, clause 7.1.3.1 for TNAN selection). The 5GC capable UE 102 may follow 3GPP TR 23.716, clause 7.1.3.3 (step 1-step 3) for establishing L2 transport connection with the N3GPP-AP, e.g. based on Ethernet, IEEE 802.3, IEEE 802.11, and using EAP encapsulation, e.g. PPP, PANA (RFC 5191) for requesting identity. In such embodiments, the interface between the N3GPP-AP (similar to TNAP but without the support of N2/N3) and the N3GPP-GF (similar to TNGF) is assumed an AAA interface. The N3GPP-GF may trigger 5G-START using L2/EAP to 5GC-capable UE (e.g., as in 3GPP TR 23.716, clause 7.1.3.3 (step 4)).

For both untrusted and trusted cases, since the N3GPP-AN regards the relay UE 502 as 5G wireless/wireline backhaul to access the 5GC 106, the N3GPP-GF may forward some or all the 5G-NAS messages between the relay UE 502 and the 5GC capable UE 102.

E. Example AMF Discovery and Selection

In one embodiment, the AMF selection functionality is supported by NG-RAN and W-5GAN to select an AMF for a 5G-RG or 5GC-capable UE. The serving AMF of 5G-RG, indicated as AMF-5G-RG, supports the AMF selection functionality to select an AMF for 5GC-capable UE. The 5GC-capable UE may simultaneously connect to 5GC via direct link to NG-RAN and via 5G-RG. The 5GC-capable UE may provide its 5G-serving temporary mobile subscriber identity (5G-S-TMSI) or 5G-globally unique temporary ID (5G-GUTI) whenever it is still valid, which ensures the same AMF is selected for the 5GC-capable UE.

The AMF-5G-RG may determine that it was not an appropriate the AMF to serve the 5GC-capable UE in, for example, the following circumstances: the 5GC-capable UE provides 5G-S-TMSI or GUAMI, which is obtained when it registered via direct link over NG-RAN, but the routing information (i.e., AMF identified based on AMF Set ID, AMF pointer) present in the 5G-S-TMSI or globally unique AMF ID (GUAMI) is with an AMF region ID from a different region; due to different allowed network slice selection assistance information (NSSAI) for 5G-RG and 5GC-capable UE (e.g., the requested NSSAI of the 5GC-capable UE is different from that of the 5G-RG and is not in allowed NSSA of the 5G-RG), wherein the same principles in 3GPP TS 23.501, clause 5.15.5.2: Selection of a Serving AMF supporting the Network Slices, may be applicable; and/or due to different serving public land mobile network (PLMN) or a home PLMN (HPLMN) of the 5GC-capable UE from that of the 5G-RG, e.g. the AMF-5G-RG selects an AMF for 5GC-capable UE in the target PLMN via the PLMN level network repository function (NRF).

In certain embodiments, the registration with AMF relocation can refer to 3GPP TS23.502, clause 4.2.2.2.3 with the following additions. The AMF-5G-RG generates a Correlation ID for the 5G-RG to associate all its connected 5GC-capable UEs. The AMF-5G-RG may have two options to reallocate a new AMF for 5GC-capable UE.

In a first option, the AMF-5G-RG forwards the NAS message of the 5GC-capable UE to the target AMF for 5GC-capable UE directly. The AMF-5G-RG invokes the Namf_Communication_N1MessageNotify to the target AMF for 5GC-capable UE with the following principles. The Namf_Communication_N1MessageNotify service operation includes the information enabling NG-RAN/W-5GAN to identify the N2 terminating point, i.e., RAN UE next generation application protocol layer (NGAP) ID of the 5GC-capable UE, the rerouted NAS message of the 5GC-capable UE, and the Correlation ID of the 5G-RG. If the AMF-5G-RG has obtained the information from the NSSF, it also includes those information in the Namf_Communication_N1MessageNotify service operation. The target AMF of the 5GC-capable UE then updates the NG-RAN/W-5GAN based on RAN UE NGAN ID of the 5GC-capable UE with a new updated N2 termination point, i.e., AMF UE NGAN ID, for the UE in the initial Context Setup message from target AMF of the 5GC-capable UE to NG-RAN/W-5GAN.

In second option, the AMF-5G-RG forwards the NAS message of the 5GC-capable UE to the target AMF via (R)AN. The NG-RAN/W-5GAN supports the AMF selection and relocation for 5GC-capable UE with the following principles. The NG-RAN/W-5GAN initiates initial UE request message to AMF-5G-RG, including a RAN UE NGAP ID for the 5GC-capable UE, when it receives indication of 5GC-capable UE in a N1 message for forwarding registration request message from 5GC-capable UE via the 5G-RG. The AMF-5G-RG includes the Correlation ID of the 5G-RG as well as the RAN UE NGAP ID for the 5GC-capable UE in the Initial Context Setup message to the NG-RAN/W-5GAN, in which the correlation ID is for the NG-RAN/W-5GAN and AMF-5G-RG to correlate the UE contexts between the 5G-RG and its connected 5GC-capable UEs. That is, the UE context of the 5GC-capable UE includes the correlation ID which can be referred to the UE context of the 5G-RG at the AMF-5G-RG and the NG-RAN/W-5GAN.

If the AMF-5G-RG determines that AMF relocation is required for a 5GC-capable UE, it sends Reroute NAS request message including a correlation ID and RAN UE NGAP ID of the 5GC-capable UE, which means that the AMF relocation is not for 5G-RG but for a 5GC-capable UE. In addition, the Reroute NAS request message may also include allowed NSSAI, AMF region ID, or AMF Set ID for a 5GC-capable UE. The NG-RAN/W-5GAN selects a new AMF accordingly and inserts the correlation ID and the RAN UE NGAP ID of the 5GC-capable UE in initial UE message. The NG-RAN/W-5GAN stores the UE context of 5GC-capable UE with termination information of N2*/N3* to the AMF-5GC-capable UE and UPF-5GC-capable UE, Correlation ID of the 5G-RG. The bridging of N2*/N3* at the NG-RAN/W-5GAN via the 5G-RG as relay UE follows the following principles. The RRC message used to transport NAS PDU at 5G-RG for 5GC-capable UE shall include 5G-S-TMSI of the 5GC-capable UE, which is used to forward the NAS message towards the registered AMF of the 5GC-capable UE. Based on PDU session ID and QoS flow identifier (QFI), the NG-RAN/W-GAN associates the corresponding N3* tunnel to forward uplink traffic to the UPF-5GC-capable UE.

F. Example Procedures

F(1). High-Level Procedure

Figure 6:
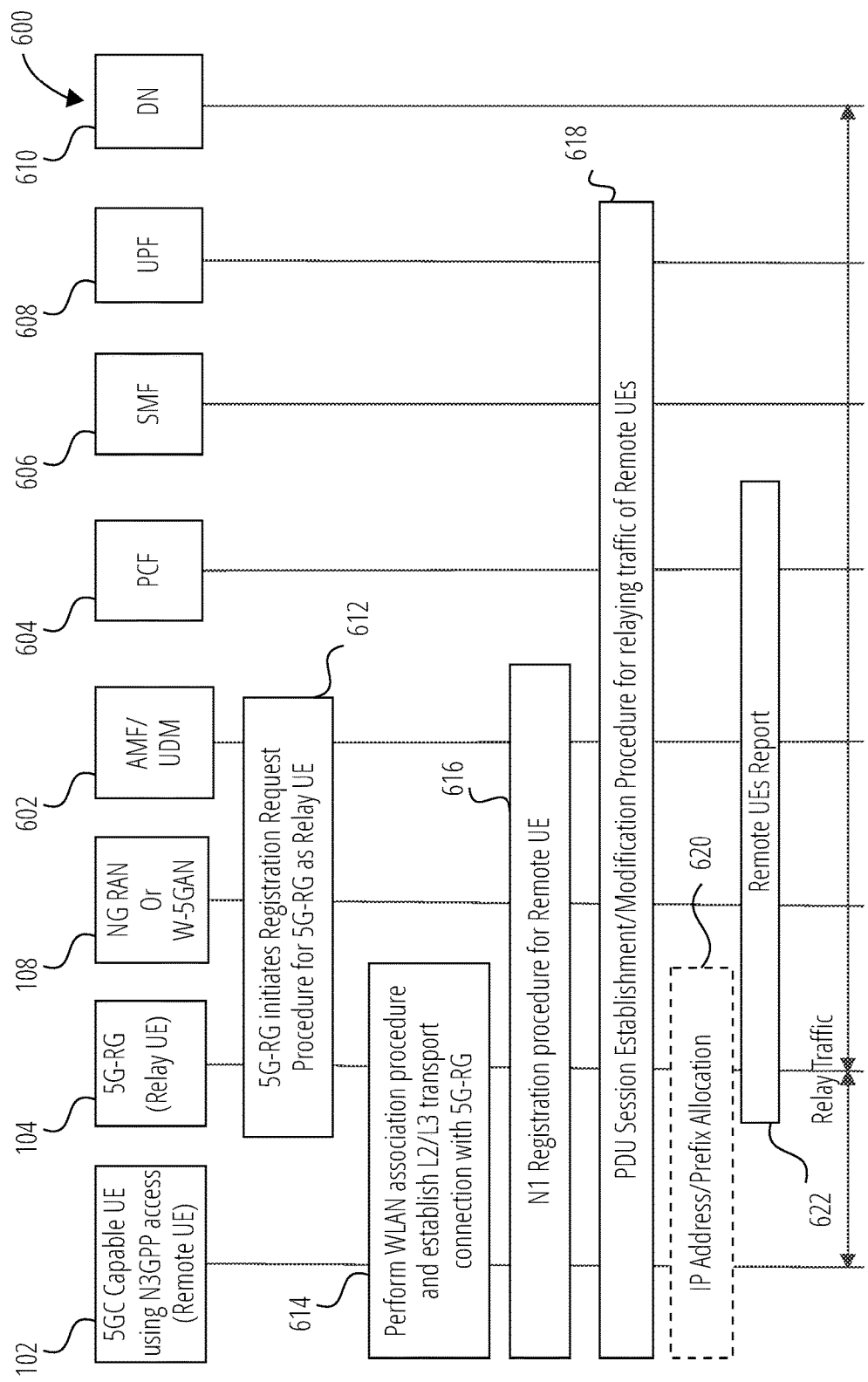
FIG. 6 illustrates a high level procedure in accordance with one embodiment.

FIG. 6 illustrates a high level procedure 600 for traffic relay between a 5G-RG 104 as a relay UE and a 5GC capable UE 102 as a remote UE using untrusted/trusted N3GPP access. The high level procedure 600 also involves an AMF 602 (or AMF/UDM), a PCF 604, an SMF 606, a UPF 608, and a DN 610.

In a block 612, the 5G-RG 104 as relay UE performs an initial registration request procedure indicating its UE network capability as a 5G-RG and a relay UE.

In a block 614 and block 616, the 5GC capable UE 102 discovers the 5G-RG 104 and establishes L2/L3 transport connection with the 5G-RG 104 using untrusted/trusted N3GPP access. Further, the relay UE in the 5G-RG 104 performs a registration procedure for the remote UE using its established N1 connection with the 5GC via the NG RAN or W-5GAN 108. For both cases, the registration request message of the remote UE is piggybacked in a N1 message, e.g. registration request, N1 transport, or a new N1 request, sent by the relay UE in the 5G-RG 104. If the registration is successful, the 5G-RG 104 allocates a remote user ID for the remote UE and stores it in a created remote user context. For the L3 transport connection with 5GC capable UE 102 using untrusted N3GPP access, the 5G-RG 104 allocates an IP address to the 5GC capable UE 102 (e.g., in the block 614).

In a block 618, after successful registration, the 5GC capable UE 102 initiates a PDU session establishment procedure and the 5G-RG 104 as relay UE sends a N1 message, e.g. PDU session establishment request, N1 transport, or a new N1 request, to forward the PDU session establishment request message sent by the 5GC capable UE 102 by piggybacking the NAS PDU in its N1 message. See, e.g., section F(3) below.

In a block 620, for the L2 transport connection with the UE 102 using trusted N3GPP access, the 5G-RG 104 allocates IP address/prefix allocation to the 5GC capable UE 102 in depending on the PDU session to be used for relaying the traffic of the 5GC capable UE 102.

In a block 622, the 5G-RG 104 sends a N1 remote UE report message to the PCF 604 and/or SMF 606 via the AMF 602. The N1 remote UE report message may include a PDU session ID and a remote user context list which includes the remote user contexts of all user devices behind the 5G-RG 104 sharing the PDU session. Certain details for the remote user context, e.g. remote user ID, address information, is discussed in section F(3) below. The N1 remote UE report message may be sent when the remote UE disconnects from the 5G-RG 104 as relay UE to inform the AMF 602 and the PCF 604 and/or the SMF 606 that the remote user(s) have left. The AMF 602 stores the PDU session ID, and the remote user context list in the UE context of the 5G-RG 104. Further, the AMF 602 forwards the N1 remote user report message to the PCF 604 via the SMF 606.

As shown in FIG. 6, the 5G-RG 104 may then start to relay traffic for the remote UE.

F(2). Registration Procedure

In certain embodiments, it may be assumed that the relay UE has registered to the 5GC via 3GPP access or trusted/untrusted N3GPP access. For example, this assumption may be made in the following cases: for 3GPP access, the registration procedure follows 3GPP TS 23.502, clause 4.2.2.2; for untrusted N3GPP access, the registration procedure follows 3GPP TS 23.502, clause 4.12.2.2; and for trusted N3GPP access, the registration procedure follows 3GPP TR 23.716 clause 7.1.3.3.

In one embodiment, the relay UE in the 5G-RG relays N1 messages, e.g. registration request/accept, of the remote UE by initiating a NAS procedure with the 5GC via the NG-RAN or W-5GAN. The registration request message of the remote UE is piggybacked in a N1 message, e.g. registration request using a new registration type or remote UE indication, N1 transport, or a new N1 request for remote UE, sent by the relay UE in the 5G-RG to the 5GC via the NG-RAN or W-5GAN. In addition, the relay UE includes remote user ID of the remote UE in the N1 message, which is obtained from the remote UE or created by the relay UE when successfully establishing the L2/L3 transport connection. Also, the relay UE may forward all the received N1 messages destined for the 5GC-capable UE via the N3GPP-GF.

The additional handling for relaying NAS messages of the remote UE via the NG-RAN or W-5GAN in the registration procedure are illustrated in the following descriptions.

For using 3GPP access via NG-RAN, the exchange of N1 messages between the relay UE and the 5GC via the NG-RAN uses existing NAS security key of the 5G-RG when the relay UE performs registration procedure for 5G-RG. The procedure can follow, for example, 3GPP TS 23.502, clause 4.2.2.2 between the relay UE in the 5G-RG and the AMF/AUSF in the 5GC with the following additions: Step 8-9 may include the AMF selecting the AUSF and indicating the relay UE authentication to the AUSF, wherein the AUSF performs authentication for the remote UE; Step 11 may be updated to include, if the identity of the remote UE is requested, the 5G-RG forwards the identity request to the remote UE by using the protocol based on corresponding L2/L3 transport connection; and/or in Step 22 the AMF may reply the N1 message including the piggybacked registration accept/reject message and accept/rejection indication to the 5G-RG, wherein the 5G-RG forwards the registration accept/reject message to the Remote UE, and wherein the 5G-RG indicates to the N3GPP-AN to disconnect the remote UE if receiving the rejection indication or continue to initiate the PDU session management procedure.

For using untrusted N3GPP access via W-5GAN (with functions similar to N3GPP AP and N3IWF), the exchange of N1 messages between the relay UE and the 5GC via N3IWF uses IPsec tunnel established when the relay UE performs registration procedure for 5G-RG. In certain embodiments, the procedure can follow Step 6b to Step 13 in 3GPP TS 23.502, clause 4.12.2.2 between the relay UE in the 5G-RG and the AMF/AUSF in the 5GC with the following additions in FIG. 4.12.2.2-1: in Step 6b the N2 message may include the registration request message of the remote UE as well as N1 message of the relay UE; in Step 12 the N2 message may include the registration accept message of the remote UE as well as N1 message of the Relay UE; in Step 10a-11b it may be studied to determine whether these steps can be skipped or whether they are needed to renew the N3IWF key or to allocate additional security keys for protecting relaying message, i.e. N1 message of the 5GC-capable UE; and/or in Step 13, depending on the decision of step 10a-11b, the registration accept message for the remote UE may be sent using established/updated IPsec.

For using trusted N3GPP access via W-5GAN (with functions similar to TNAP and TNGF), the exchange of N1 messages between the relay UE and the 5GC via the W-5GAN uses L2 connection with TNAP and established IPSec/NWt-cp connection using security key (e.g., TNGF) which is received when the relay UE performs a registration procedure for 5G-RG via W-5GAN. In certain embodiments, the procedure can follow Step 6b to Step 15 in 3GPP TR 23.716, clause 7.1.3.3 between the relay UE in the 5G-RG and the AMF/AUSF in the 5GC with the following additions in FIG. 7.1.3.3-1: in Step 6b the N2 message may include the registration request message of the remote UE as well as N1 message of the relay UE; in Step 7a-14 the AMF and AUSF may handle the N1 request for the 5GC-capable UE, e.g. UE context creation/updates at AMF, authentication and authorization at AUSF, wherein further study may be needed to determine whether these steps can be skipped or whether they are needed to renew the TNGF key or to allocate additional security keys for protecting relaying message, i.e. N1 message of the 5GC-capable UE; in Step 15a the N2 message may include the registration accept message of the remote UE as well as N1 message of the Relay UE; and/or in Step 15b, depending on the decision of step 7a-14, the registration accept message for the remote UE may be sent using established/updated IPSec/NWt-cp connection.

F(3). PDU Session Establishment Modification Procedure

In certain embodiments, after successful registration, the relay UE may establish and/or modify the PDU session via 3GPP access or trusted/untrusted N3GPP access. For 3GPP access, the PDU session establishment/modification procedure may follow, for example, 3GPP TS 23.502, clause 4.3.2.2 and clause 4.3.2.3, which is hereby incorporated by reference herein. For untrusted N3GPP access, the PDU session establishment/modification procedure may follow, for example, 3GPP TS 23.502, clause 4.12.5 and clause 4.12.6, which is hereby incorporated by reference herein. For trusted N3GPP access, the PDU session establishment procedure may follow, for example, 3GPP TR 23.716, clause 7.1.3.4 (step 20-24) using NAS over IPSec/NWt-cp options, which is hereby incorporated by reference herein.

Based on the local policy or UE subscriptions, a single PDU session with a particular DDN, NSSAI, and SSC mode, may be used for carrying traffic from the 5G-RG and the 5GC-capable UE. In this case, the same AMF/SMF/PCF is selected to handle registrations for the 5G-RG and the 5GC-capable UE, and the SMF may add a PSA to transport traffics of the 5G-RG and the 5GC-capable UE towards different UPFs destined to the same DN.

Based on the local policy or UE subscriptions, multiple PDU sessions may be used for the 5G-RG to carry its own traffic and the remote UEs' traffic, respectively, when the 5G-RG and the 5GC-capable UEs are registered at the same AMF with different SMF for the 5G-RG and the 5GC-capable UE (as shown in FIG. 3) or different AMFs (as shown in FIG. 4).

In certain embodiment, it may be assumed that the multiple PDU sessions are established for carrying traffic of the 5G-RG and the 5GC-capable UEs, respectively. For cases of accessing the 5GC via the NG-RAN, W-5GAN (with N3GPP AP and N3IWF) supporting untrusted N3GPP access, and the W-5GAN (with TNAP and TNGF) supporting trusted N3GPP access, the following principles may be applied.

The 5G-RG may use different PDU sessions for its own traffic and for relaying the 5GC-capable UEs' traffic.

The RRC message may be used to transport NAS PDU may include 5G-S-TMSI of the 5GC-capable UE, which is used to forward the NAS message towards the registered AMF of the 5GC-capable UE.

The 5G-RG may manage one or more PDU sessions for 5GC-capable UE. A PDU session with associated DNN, S-NSSAI that is required by different 5GC-capable UEs may be used by the 5G-RG to relay traffic of those 5GC-capable UEs.

Based on the information of S-NSSAI(s), DNN in the NAS message sent by the 5GC-capable UE, the 5G-RG may determine whether to forward the NAS message to the AMF or to use an existing PDU session with requested DNN and S-NSSAI(s).

If there is no existing PDU session with associated DNN, S-NSSAI that is requested by the 5GC-capable UE, the 5G-RG may create a PDU session ID which is unique within the 5G-RG. The 5G-RG may then send the NAS request to the AMF of the 5GC-capable UE, in which the NAS message replaces the PDU session ID generated by the 5GC-capable UE with the 5G-RG generated PDU session ID and a request type is set as "relay traffic."

If using an existing PDU session with associated DNN, S-NSSAI, and application IDs, the 5G-RG may choose a proper QoS flow identified by QFI to relay traffic for the 5GC-capable UE. The 5G-RG may receive a QoS rule from a PDU Session Establishment/Modification/Management request procedure sent from the 5GC-capable UE, or the QoS rule may be pre-configured in the 5G-RG. The QoS rule may include a QoS rule identifier, which is unique within the PDU Session, and the QFI of the associated QoS flow.

The 5G-RG may create a remote UE connection context which includes PDU session ID used for relaying traffic (generated by the 5G-RG), PDU session ID provided by the remote UE, remote user context list, application ID(s), DNN, and/or S-NSSAI. Each remote user context may include the following information: remote user ID, address type, address information, and QFI for the PDU session ID to be used for the relay traffic. For IPv4 address type, the 5G-RG may include IPv4 addresses and TCP/UDP port ranges assigned to individual remote user. For IPv6 address type, the 5G-RG may include IPv6 prefix(es) assigned to individual remote user.

Based on AN resources mapping to the QoS flow marked with the QFI of the PDU session of 5G-RG for relaying traffic of 5GC-capable UE, the NG-RAN/W-GAN associates the corresponding N3* tunnel to forward uplink traffic to the UPF-5GC-capable UE.

Example Systems and Apparatuses

Figure 7:
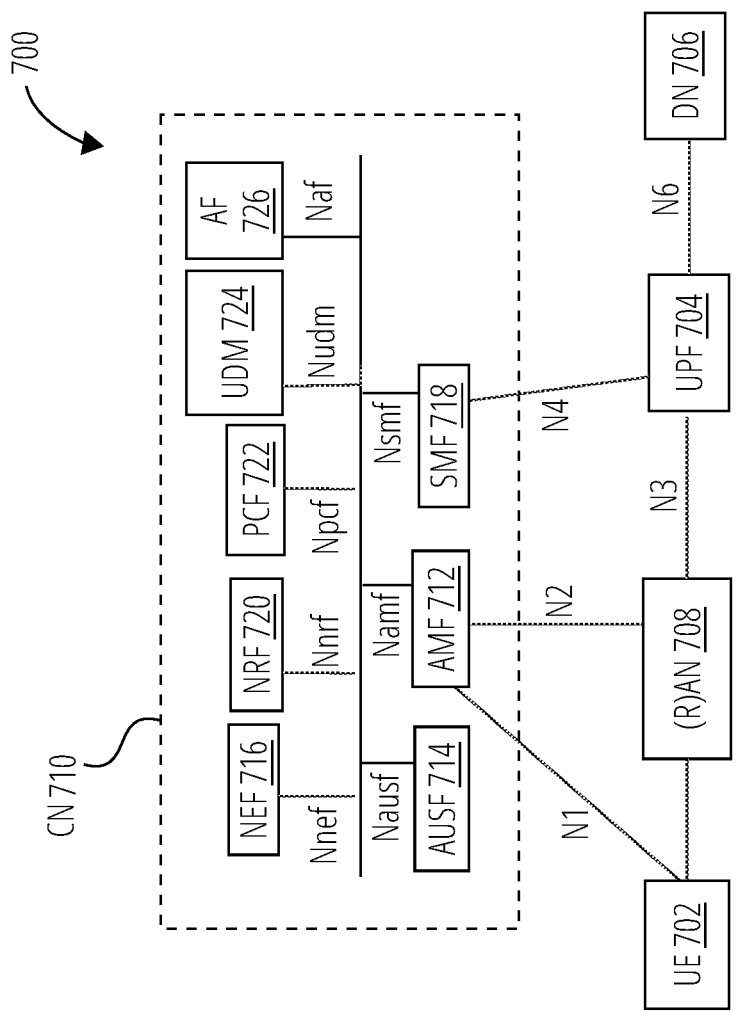
FIG. 7 illustrates a system in accordance with one embodiment.

FIG. 7 illustrates an architecture of a system 700 of a network in accordance with some embodiments. The system 700 is shown to include a UE 702; a 5G access node or RAN node (shown as (R)AN node 708); a User Plane Function (shown as UPF 704); a Data Network (DN 706), which may be, for example, operator services, Internet access or 3rd party services; and a 5G Core Network (5GC) (shown as CN 710).

The CN 710 may include an Authentication Server Function (AUSF 714); a Core Access and Mobility Management Function (AMF 712); a Session Management Function (SMF 718); a Network Exposure Function (NEF 716); a Policy Control Function (PCF 722); a Network Function (NF) Repository Function (NRF 720); a Unified Data Management (UDM 724); and an Application Function (AF 726). The CN 710 may also include other elements that are not shown, such as a Structured Data Storage network function (SDSF), an Unstructured Data Storage network function (UDSF), and the like.

The UPF 704 may act as an anchor point for intra-RAT and inter-RAT mobility, an external PDU session point of interconnect to DN 706, and a branching point to support multi-homed PDU session. The UPF 704 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 704 may include an uplink classifier to support routing traffic flows to a data network. The DN 706 may represent various network operator services, Internet access, or third party services.

The AUSF 714 may store data for authentication of UE 702 and handle authentication related functionality. The AUSF 714 may facilitate a common authentication framework for various access types.

The AMF 712 may be responsible for registration management (e.g., for registering UE 702, etc.), connection management, reachability management, mobility management, and lawful interception of AMF-related events, and access authentication and authorization. AMF 712 may provide transport for SM messages for the SMF 718, and act as a transparent proxy for routing SM messages. AMF 712 may also provide transport for short message service (SMS) messages between UE 702 and an SMS function (SMSF) (not shown by FIG. 7). AMF 712 may act as Security Anchor Function (SEA), which may include interaction with the AUSF 714 and the UE 702, receipt of an intermediate key that was established as a result of the UE 702 authentication process. Where USIM based authentication is used, the AMF 712 may retrieve the security material from the AUSF 714. AMF 712 may also include a Security Context Management (SCM) function, which receives a key from the SEA that it uses to derive access-network specific keys. Furthermore, AMF 712 may be a termination point of RAN CP interface (N2 reference point), a termination point of NAS (NI) signaling, and perform NAS ciphering and integrity protection.

AMF 712 may also support NAS signaling with a UE 702 over an N3 interworking-function (IWF) interface. The N3IWF may be used to provide access to untrusted entities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS (NI) signaling between the UE 702 and AMF 712, and relay uplink and downlink user-plane packets between the UE 702 and UPF 704. The N3IWF also provides mechanisms for IPsec tunnel establishment with the UE 702.

The SMF 718 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 718 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/authentication by external DN.

The NEF 716 may provide means for securely exposing the services and capabilities provided by 3GPP network functions for third party, internal exposure/re-exposure, Application Functions (e.g., AF 726), edge computing or fog computing systems, etc. In such embodiments, the NEF 716 may authenticate, authorize, and/or throttle the AFs. NEF 716 may also translate information exchanged with the AF 726 and information exchanged with internal network functions. For example, the NEF 716 may translate between an AF-Service-Identifier and an internal 5GC information. NEF 716 may also receive information from other network functions (NFs) based on exposed capabilities of other network functions. This information may be stored at the NEF 716 as structured data, or at a data storage NF using a standardized interfaces. The stored information can then be re-exposed by the NEF 716 to other NFs and AFs, and/or used for other purposes such as analytics.

The NRF 720 may support service discovery functions, receive NF Discovery Requests from NF instances, and provide the information of the discovered NF instances to the NF instances. NRF 720 also maintains information of available NF instances and their supported services.

The PCF 722 may provide policy rules to control plane function(s) to enforce them, and may also support unified policy framework to govern network behavior. The PCF 722 may also implement a front end (FE) to access subscription information relevant for policy decisions in a UDR of UDM 724.

The UDM 724 may handle subscription-related information to support the network entities' handling of communication sessions, and may store subscription data of UE 702. The UDM 724 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 722. UDM 724 may also support SMS management, wherein an SMS-FE implements the similar application logic as discussed previously.

The AF 726 may provide application influence on traffic routing, access to the Network Capability Exposure (NCE), and interact with the policy framework for policy control. The NCE may be a mechanism that allows the 5GC and AF 726 to provide information to each other via NEF 716, which may be used for edge computing implementations. In such implementations, the network operator and third party services may be hosted close to the UE 702 access point of attachment to achieve an efficient service delivery through the reduced end-to-end latency and load on the transport network. For edge computing implementations, the 5GC may select a UPF 704 close to the UE 702 and execute traffic steering from the UPF 704 to DN 706 via the N6 interface. This may be based on the UE subscription data, UE location, and information provided by the AF 726. In this way, the AF 726 may influence UPF (re)selection and traffic routing. Based on operator deployment, when AF 726 is considered to be a trusted entity, the network operator may permit AF 726 to interact directly with relevant NFs.

As discussed previously, the CN 710 may include an SMSF, which may be responsible for SMS subscription checking and verification, and relaying SM messages to/from the UE 702 to/from other entities, such as an SMS-GMSC/IWMSC/SMS-router. The SMS may also interact with AMF 712 and UDM 724 for notification procedure that the UE 702 is available for SMS transfer (e.g., set a UE not reachable flag, and notifying UDM 724 when UE 702 is available for SMS).

The system 700 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 700 may include the following reference points: N1: Reference point between the UE and the AMF; N2: Reference point between the (R)AN and the AMF; N3:

Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an N11 reference point between the AMF and SMF; etc. In some embodiments, the CN 710 may include an Nx interface, which is an inter-CN interface between the MME (e.g., MME(s) 1028) and the AMF 712 in order to enable interworking between CN 710 and CN 1206.

Although not shown by FIG. 7, the system 700 may include multiple RAN nodes (such as (R)AN node 708) wherein an Xn interface is defined between two or more (R)AN node 708 (e.g., gNBs and the like) that connecting to 5GC 410, between a (R)AN node 708 (e.g., gNB) connecting to CN 710 and an eNB, and/or between two eNBs connecting to CN 710.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 702 in a connected mode (e.g., CM-CONNECTED) including functionality to manage the UE mobility for connected mode between one or more (R)AN node 708. The mobility support may include context transfer from an old (source) serving (R)AN node 708 to new (target) serving (R)AN node 708; and control of user plane tunnels between old (source) serving (R)AN node 708 to new (target) serving (R)AN node 708.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 8:
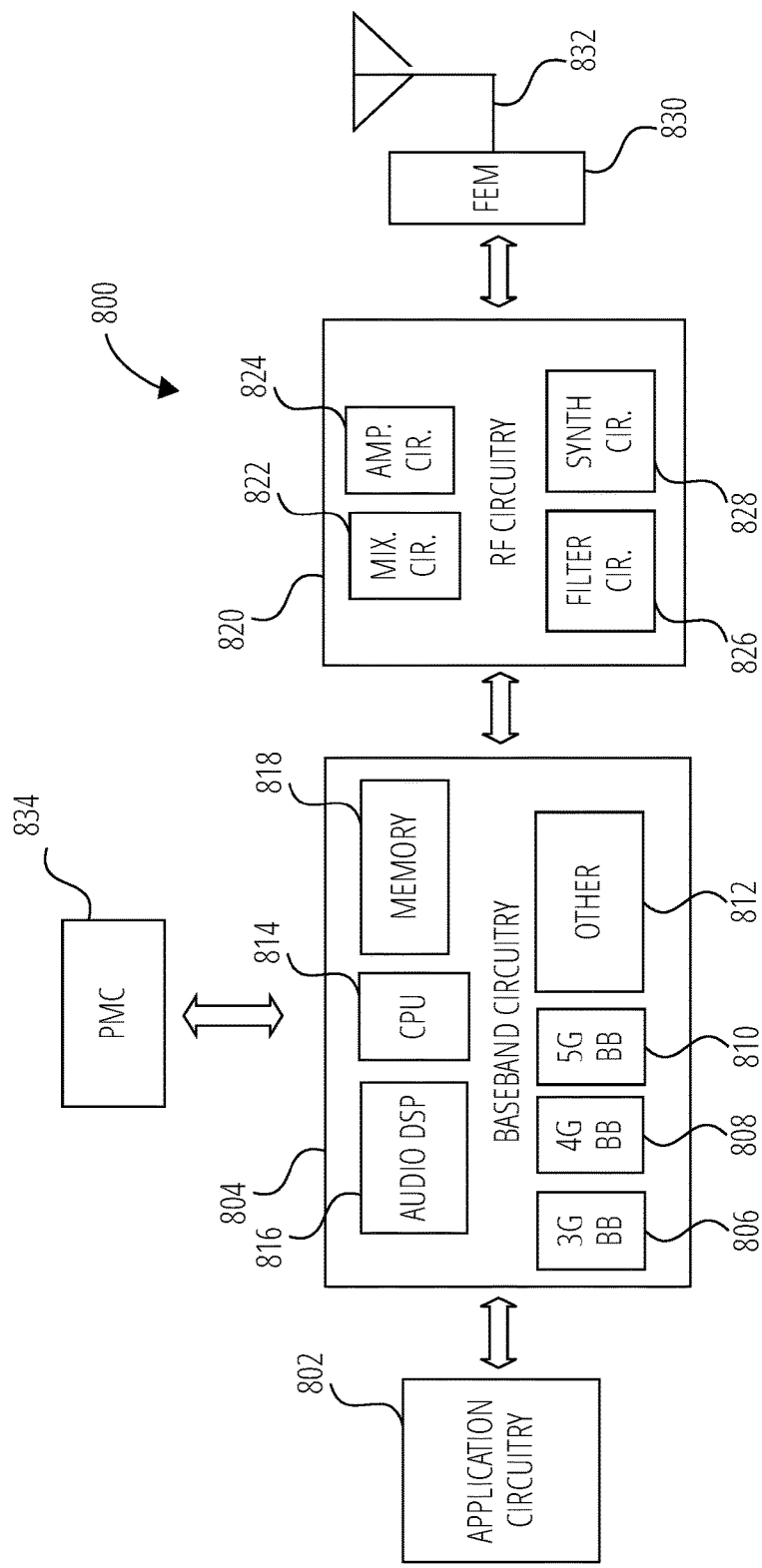
FIG. 8 illustrates a device in accordance with one embodiment.

FIG. 8 illustrates example components of a device 800 in accordance with some embodiments. In some embodiments, the device 800 may include application circuitry 802, baseband circuitry 804, Radio Frequency (RF) circuitry (shown as RF circuitry 820), front-end module (FEM) circuitry (shown as FEM circuitry 830), one or more antennas 832, and power management circuitry (PMC) (shown as PMC 834) coupled together at least as shown. The components of the illustrated device 800 may be included in a UE or a RAN node. In some embodiments, the device 800 may include fewer elements (e.g., a RAN node may not utilize application circuitry 802, and instead include a processor/controller to process IP data received from an EPC). In some embodiments, the device 800 may include additional elements such as, for example, memory/storage, display, camera, sensor, or input/output) I/O (interface. In other embodiments, the components described below may be included in more than one device) e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor)s (may include any combination of general-purpose processors and dedicated processors) e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 820 and to generate baseband signals for a transmit signal path of the RF circuitry 820. The baseband circuitry 804 may interface with the application circuitry 802 for generation and processing of the baseband signals and for controlling operations of the RF circuitry 820. For example, in some embodiments, the baseband circuitry 804 may include a third generation (3G) baseband processor (3G baseband processor 806), a fourth generation (4G) baseband processor (4G baseband processor 808), a fifth generation (5G) baseband processor (5G baseband processor 810), or other baseband processor(s) 812 for other existing generations, generations in development or to be developed in the future (e.g., second generation (2G), sixth generation (6G), etc.). The baseband circuitry 804 (e.g., one or more of baseband processors) may handle various radio control functions that enable communication with one or more radio networks via the RF circuitry 820. In other embodiments, some or all of the functionality of the illustrated baseband processors may be included in modules stored in the memory 818 and executed via a Central Processing Unit (CPU 814). The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include a digital signal processor (DSP), such as one or more audio DSP(s) 816. The one or more audio DSP(s) 816 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 804 is configured to support radio communications of more than one wireless protocol may be referred to as multi-mode baseband circuitry.

The RF circuitry 820 may enable communication with wireless networks using modulated electromagnetic radiation through a non-solid medium. In various embodiments, the RF circuitry 820 may include switches, filters, amplifiers, etc. to facilitate the communication with the wireless network. The RF circuitry 820 may include a receive signal path which may include circuitry to down-convert RF signals received from the FEM circuitry 830 and provide baseband signals to the baseband circuitry 804. The RF circuitry 820 may also include a transmit signal path which may include circuitry to up-convert baseband signals provided by the baseband circuitry 804 and provide RF output signals to the FEM circuitry 830 for transmission.

In some embodiments, the receive signal path of the RF circuitry 820 may include mixer circuitry 822, amplifier circuitry 824 and filter circuitry 826. In some embodiments, the transmit signal path of the RF circuitry 820 may include filter circuitry 826 and mixer circuitry 822. The RF circuitry 820 may also include synthesizer circuitry 828 for synthesizing a frequency for use by the mixer circuitry 822 of the receive signal path and the transmit signal path. In some embodiments, the mixer circuitry 822 of the receive signal path may be configured to down-convert RF signals received from the FEM circuitry 830 based on the synthesized frequency provided by synthesizer circuitry 828. The amplifier circuitry 824 may be configured to amplify the down-converted signals and the filter circuitry 826 may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, the mixer circuitry 822 of the receive signal path may comprise passive mixers, although the scope of the embodiments is not limited in this respect.

In some embodiments, the mixer circuitry 822 of the transmit signal path may be configured to up-convert input baseband signals based on the synthesized frequency provided by the synthesizer circuitry 828 to generate RF output signals for the FEM circuitry 830. The baseband signals may be provided by the baseband circuitry 804 and may be filtered by the filter circuitry 826.

In some embodiments, the mixer circuitry 822 of the receive signal path and the mixer circuitry 822 of the transmit signal path may include two or more mixers and may be arranged for quadrature downconversion and upconversion, respectively. In some embodiments, the mixer circuitry 822 of the receive signal path and the mixer circuitry 822 of the transmit signal path may include two or more mixers and may be arranged for image rejection (e.g., Hartley image rejection). In some embodiments, the mixer circuitry 822 of the receive signal path and the mixer circuitry 822 may be arranged for direct downconversion and direct upconversion, respectively. In some embodiments, the mixer circuitry 822 of the receive signal path and the mixer circuitry 822 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 820 may include analog-to-digital converter (ADC) and digital-to-analog converter (DAC) circuitry and the baseband circuitry 804 may include a digital baseband interface to communicate with the RF circuitry 820.

In some dual-mode embodiments, a separate radio IC circuitry may be provided for processing signals for each spectrum, although the scope of the embodiments is not limited in this respect.

In some embodiments, the synthesizer circuitry 828 may be a fractional-N synthesizer or a fractional N/N+1 synthesizer, although the scope of the embodiments is not limited in this respect as other types of frequency synthesizers may be suitable. For example, synthesizer circuitry 828 may be a delta-sigma synthesizer, a frequency multiplier, or a synthesizer comprising a phase-locked loop with a frequency divider.

The synthesizer circuitry 828 may be configured to synthesize an output frequency for use by the mixer circuitry 822 of the RF circuitry 820 based on a frequency input and a divider control input. In some embodiments, the synthesizer circuitry 828 may be a fractional N/N+1 synthesizer.

In some embodiments, frequency input may be provided by a voltage controlled oscillator (VCO), although that is not a requirement. Divider control input may be provided by either the baseband circuitry 804 or the application circuitry 802 (such as an applications processor) depending on the desired output frequency. In some embodiments, a divider control input (e.g., N) may be determined from a look-up table based on a channel indicated by the application circuitry 802.

Synthesizer circuitry 828 of the RF circuitry 820 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 828 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 820 may include an IQ/polar converter.

The FEM circuitry 830 may include a receive signal path which may include circuitry configured to operate on RF signals received from one or more antennas 832, amplify the received signals and provide the amplified versions of the received signals to the RF circuitry 820 for further processing. The FEM circuitry 830 may also include a transmit signal path which may include circuitry configured to amplify signals for transmission provided by the RF circuitry 820 for transmission by one or more of the one or more antennas 832. In various embodiments, the amplification through the transmit or receive signal paths may be done solely in the RF circuitry 820, solely in the FEM circuitry 830, or in both the RF circuitry 820 and the FEM circuitry 830.

In some embodiments, the FEM circuitry 830 may include a TX/RX switch to switch between transmit mode and receive mode operation. The FEM circuitry 830 may include a receive signal path and a transmit signal path. The receive signal path of the FEM circuitry 830 may include an LNA to amplify received RF signals and provide the amplified received RF signals as an output (e.g., to the RF circuitry 820). The transmit signal path of the FEM circuitry 830 may include a power amplifier (PA) to amplify input RF signals (e.g., provided by the RF circuitry 820), and one or more filters to generate RF signals for subsequent transmission (e.g., by one or more of the one or more antennas 832).

In some embodiments, the PMC 834 may manage power provided to the baseband circuitry 804. In particular, the PMC 834 may control power-source selection, voltage scaling, battery charging, or DC-to-DC conversion. The PMC 834 may often be included when the device 800 is capable of being powered by a battery, for example, when the device 800 is included in a UE. The PMC 834 may increase the power conversion efficiency while providing desirable implementation size and heat dissipation characteristics.

FIG. 8 shows the PMC 834 coupled only with the baseband circuitry 804. However, in other embodiments, the PMC 834 may be additionally or alternatively coupled with, and perform similar power management operations for, other components such as, but not limited to, the application circuitry 802, the RF circuitry 820, or the FEM circuitry 830.

In some embodiments, the PMC 834 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC_Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 802 and processors of the baseband circuitry 804 may be used to execute elements of one or more instances of a protocol stack. For example, processors of the baseband circuitry 804, alone or in combination, may be used to execute Layer 3, Layer 2, or Layer 1 functionality, while processors of the application circuitry 802 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
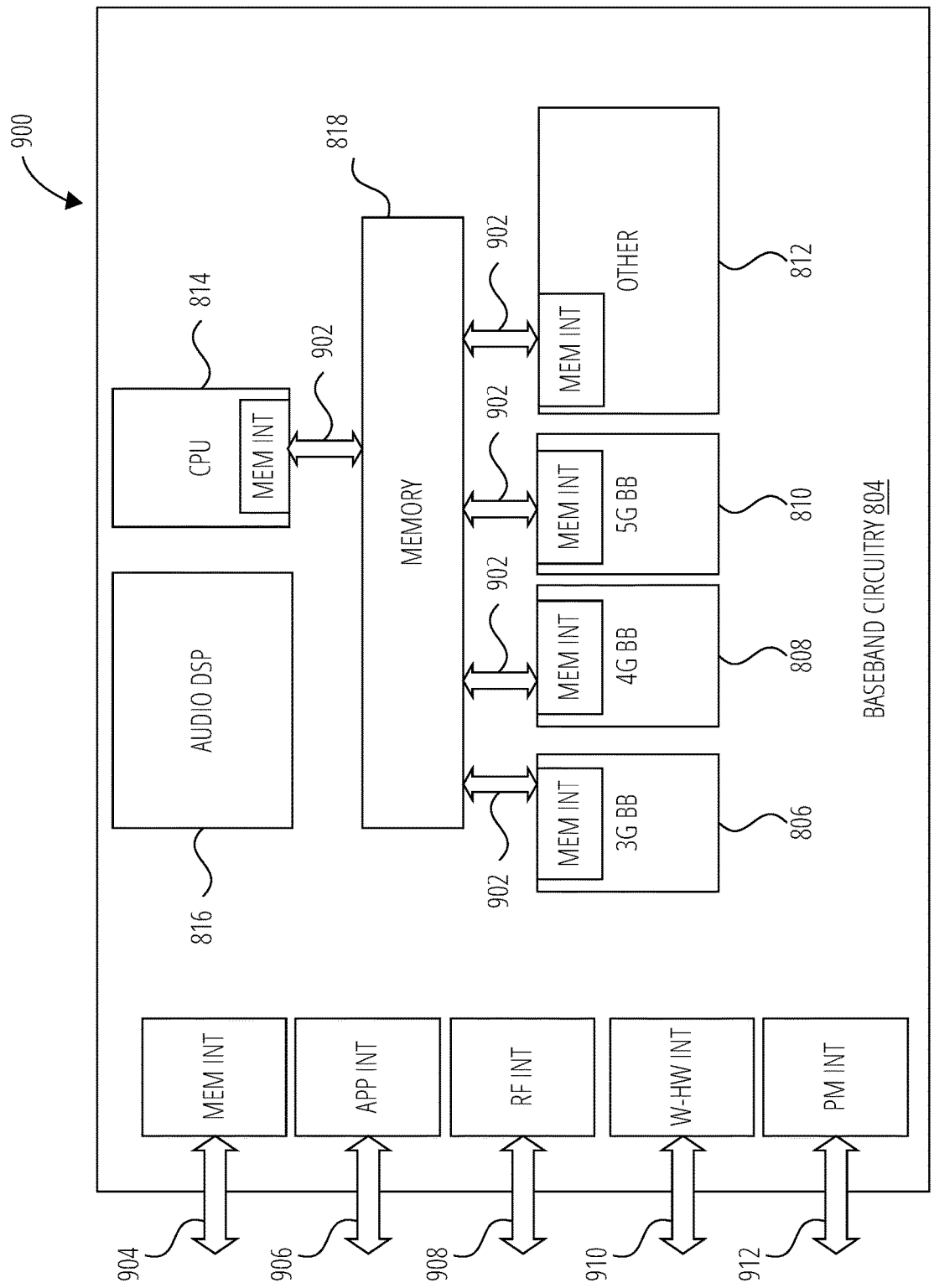
FIG. 9 illustrates example interfaces in accordance with one embodiment.

FIG. 9 illustrates example interfaces 900 of baseband circuitry in accordance with some embodiments. As discussed above, the baseband circuitry 804 of FIG. 8 may comprise 3G baseband processor 806, 4G baseband processor 808, 5G baseband processor 810, other baseband processor(s) 812, CPU 814, and a memory 818 utilized by said processors. As illustrated, each of the processors may include a respective memory interface 902 to send/receive data to/from the memory 818.

The baseband circuitry 804 may further include one or more interfaces to communicatively couple to other circuitries/devices, such as a memory interface 904 (e.g., an interface to send/receive data to/from memory external to the baseband circuitry 804), an application circuitry interface 906 (e.g., an interface to send/receive data to/from the application circuitry 802 of FIG. 8), an RF circuitry interface 908 (e.g., an interface to send/receive data to/from RF circuitry 820 of FIG. 8), a wireless hardware connectivity interface 910 (e.g., an interface to send/receive data to/from Near Field Communication (NFC) components, Bluetooth® components (e.g., Bluetooth® Low Energy), Wi-Fi® components, and other communication components), and a power management interface 912 (e.g., an interface to send/receive power or control signals to/from the PMC 834.

Figure 10:
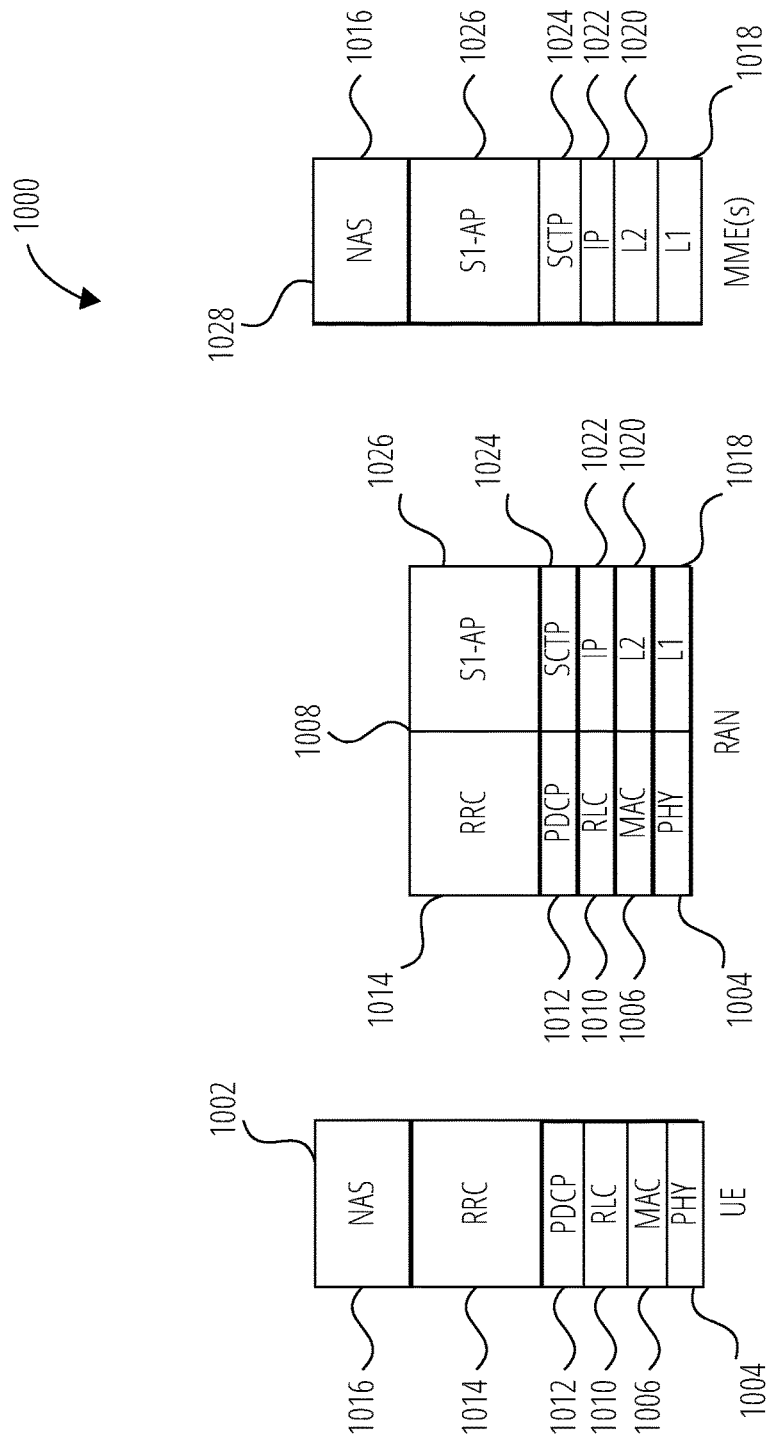
FIG. 10 illustrates a control plane in accordance with one embodiment.

FIG. 10 is an illustration of a control plane protocol stack in accordance with some embodiments. In this embodiment, a control plane 1000 is shown as a communications protocol stack between the UE 1002, the RAN 1008, and the MME(s) 1028.

A PHY layer 1004 may transmit or receive information used by the MAC layer 1006 over one or more air interfaces. The PHY layer 1004 may further perform link adaptation or adaptive modulation and coding (AMC), power control, cell search (e.g., for initial synchronization and handover purposes), and other measurements used by higher layers, such as an RRC layer 1014. The PHY layer 1004 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1006 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

An RLC layer 1010 may operate in a plurality of modes of operation, including: Transparent Mode (TM), Unacknowledged Mode (UM), and Acknowledged Mode (AM). The RLC layer 1010 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1010 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

A PDCP layer 1012 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1014 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 1002 and the RAN 1008 may utilize a Uu interface (e.g., an LTE-Uu interface) to exchange control plane data via a protocol stack comprising the PHY layer 1004, the MAC layer 1006, the RLC layer 1010, the PDCP layer 1012, and the RRC layer 1014.

In the embodiment shown, the non-access stratum (NAS) protocols (NAS protocols 1016) form the highest stratum of the control plane between the UE 1002 and the MME(s) 1028. The NAS protocols 1016 support the mobility of the UE 1002 and the session management procedures to establish and maintain IP connectivity between the UE 1002 and the P-GW 1108.

The S1 Application Protocol (S1-AP) layer (S1-AP layer 1026) may support the functions of the S1 interface and comprise Elementary Procedures (EPs). An EP is a unit of interaction between the RAN 1008 and the CN 1206. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the stream control transmission protocol/internet protocol (SCTP/IP) layer) (SCTP layer 1024) may ensure reliable delivery of signaling messages between the RAN 1008 and the MME(s) 1028 based, in part, on the IP protocol, supported by an IP layer 1022. An L2 layer 1020 and an L1 layer 1018 may refer to communication links (e.g., wired or wireless) used by the RAN node and the MME to exchange information.

The RAN 1008 and the MME(s) 1028 may utilize an S1-MME interface to exchange control plane data via a protocol stack comprising the L1 layer 1018, the L2 layer 1020, the IP layer 1022, the SCTP layer 1024, and the S1-AP layer 1026.

Figure 11:
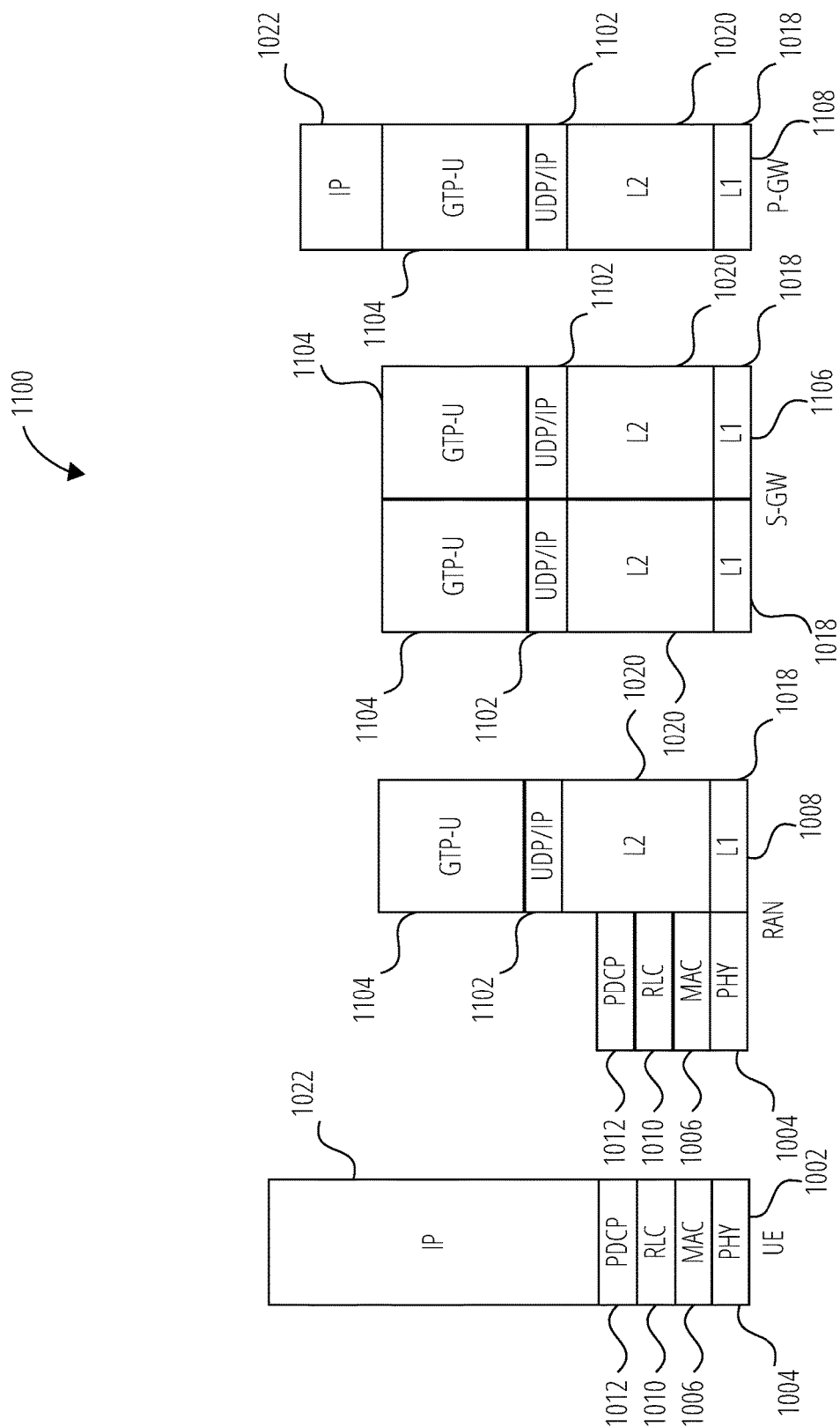
FIG. 11 illustrates a user plane in accordance with one embodiment.

FIG. 11 is an illustration of a user plane protocol stack in accordance with some embodiments. In this embodiment, a user plane 1100 is shown as a communications protocol stack between the UE 1002, the RAN 1008, the S-GW 1106, and the P-GW 1108. The user plane 1100 may utilize at least some of the same protocol layers as the control plane 1000. For example, the UE 1002 and the RAN 1008 may utilize a Uu interface (e.g., an LTE-Uu interface) to exchange user plane data via a protocol stack comprising the PHY layer 1004, the MAC layer 1006, the RLC layer 1010, the PDCP layer 1012.

The General Packet Radio Service (GPRS) Tunneling Protocol for the user plane (GTP-U) layer (GTP-U layer 1104) may be used for carrying user data within the GPRS core network and between the radio access network and the core network. The user data transported can be packets in any of IPv4, IPv6, or PPP formats, for example. The UDP and IP security (UDP/IP) layer (UDP/IP layer 1102) may provide checksums for data integrity, port numbers for addressing different functions at the source and destination, and encryption and authentication on the selected data flows. The RAN 1008 and the S-GW 1106 may utilize an S1-U interface to exchange user plane data via a protocol stack comprising the L1 layer 1018, the L2 layer 1020, the UDP/IP layer 1102, and the GTP-U layer 1104. The S-GW 1106 and the P-GW 1108 may utilize an S5/S8a interface to exchange user plane data via a protocol stack comprising the L1 layer 1018, the L2 layer 1020, the UDP/IP layer 1102, and the GTP-U layer 1104. As discussed above with respect to FIG. 10, NAS protocols support the mobility of the UE 1002 and the session management procedures to establish and maintain IP connectivity between the UE 1002 and the P-GW 1108.

Figure 12:
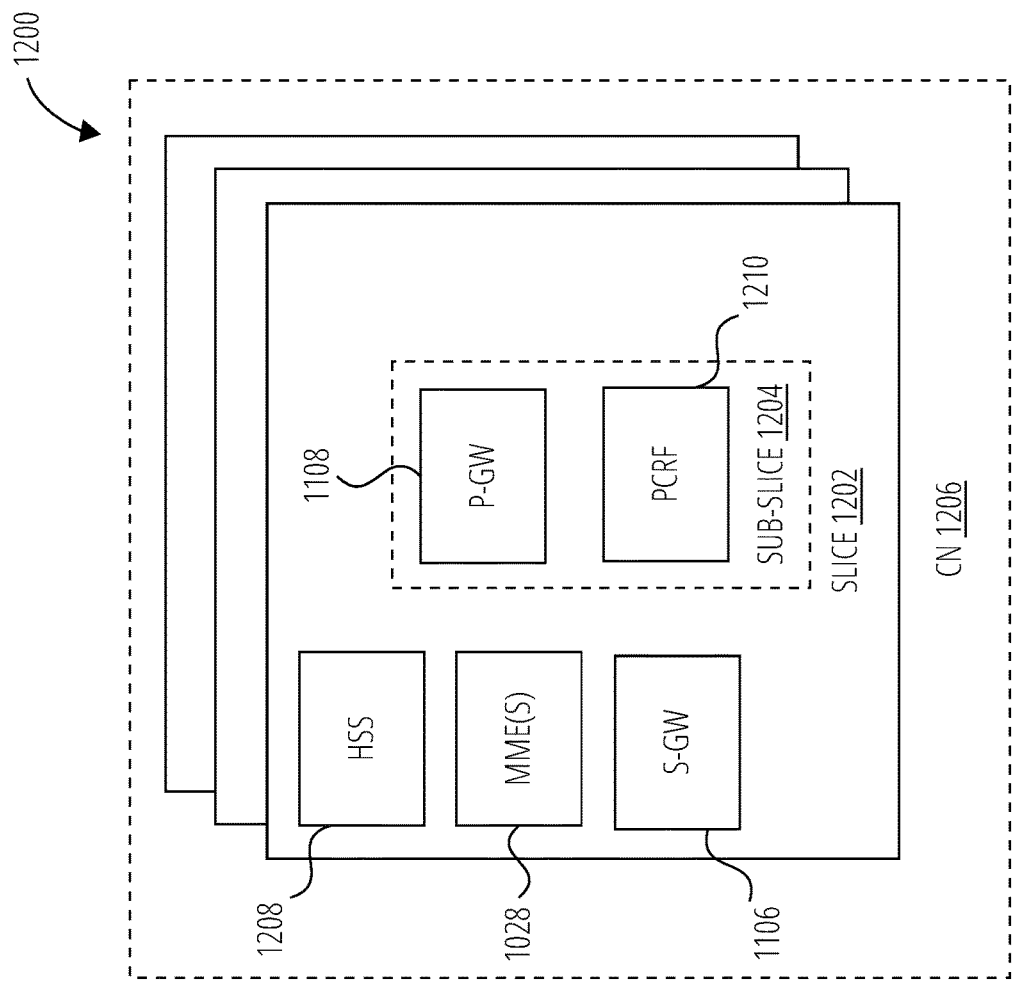
FIG. 12 illustrates components in accordance with one embodiment.

FIG. 12 illustrates components 1200 of a core network in accordance with some embodiments. The components of the CN 1206 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 1206 may be referred to as a network slice 1202 (e.g., the network slice 1202 is shown to include the HSS 1208, the MME(s) 1028, and the S-GW 1106). A logical instantiation of a portion of the CN 1206 may be referred to as a network sub-slice 1204 (e.g., the network sub-slice 1204 is shown to include the P-GW 1108 and the PCRF 1210).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 13:
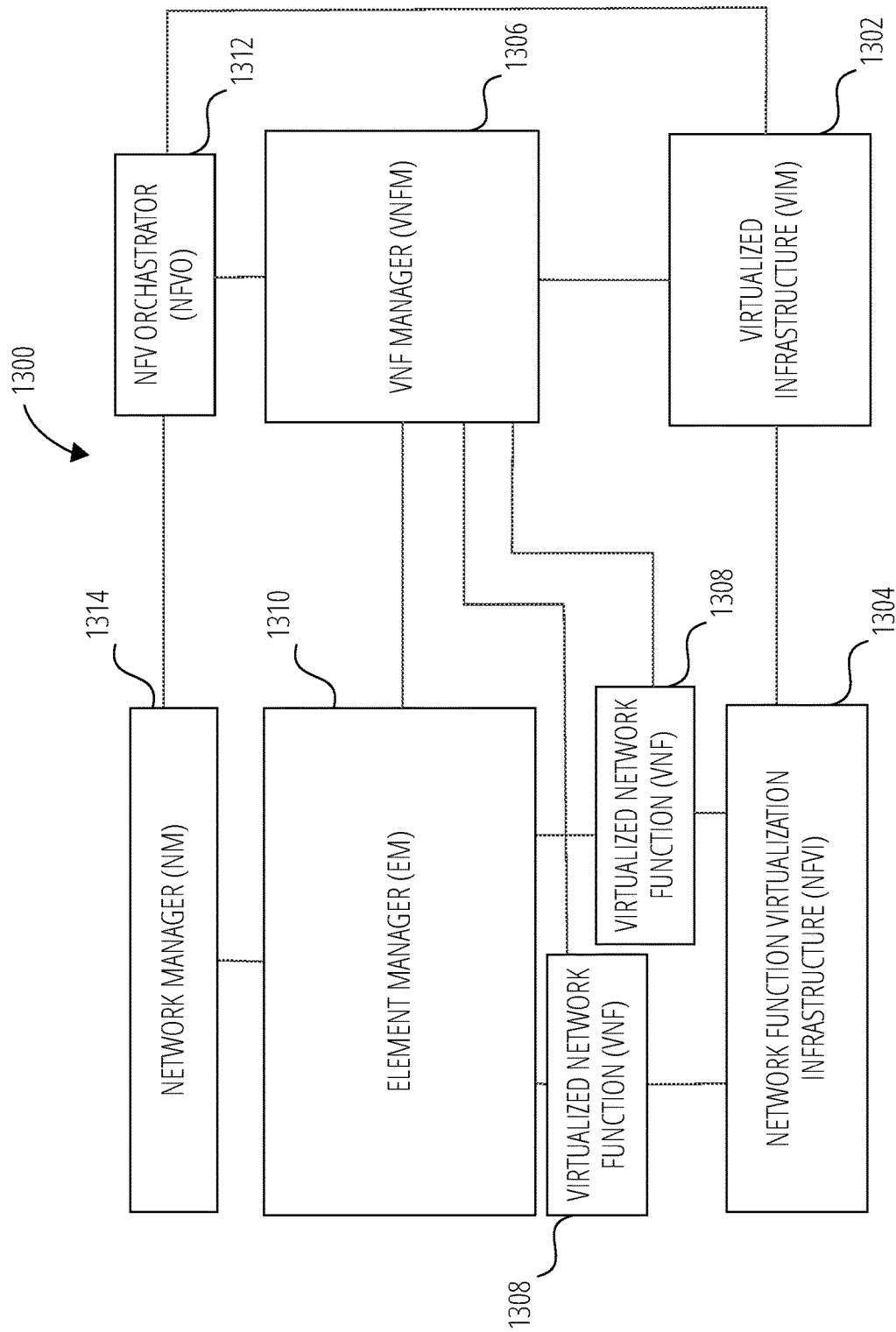
FIG. 13 illustrates a system in accordance with one embodiment.

FIG. 13 is a block diagram illustrating components, according to some example embodiments, of a system 1300 to support NFV. The system 1300 is illustrated as including a virtualized infrastructure manager (shown as VIM 1302), a network function virtualization infrastructure (shown as NFVI 1304), a VNF manager (shown as VNFM 1306), virtualized network functions (shown as VNF 1308), an element manager (shown as EM 1310), an NFV Orchestrator (shown as NFVO 1312), and a network manager (shown as NM 1314).

The VIM 1302 manages the resources of the NFVI 1304. The NFVI 1304 can include physical or virtual resources and applications (including hypervisors) used to execute the system 1300. The VIM 1302 may manage the life cycle of virtual resources with the NFVI 1304 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1306 may manage the VNF 1308. The VNF 1308 may be used to execute EPC components/functions. The VNFM 1306 may manage the life cycle of the VNF 1308 and track performance, fault and security of the virtual aspects of VNF 1308. The EM 1310 may track the performance, fault and security of the functional aspects of VNF 1308. The tracking data from the VNFM 1306 and the EM 1310 may comprise, for example, performance measurement (PM) data used by the VIM 1302 or the NFVI 1304. Both the VNFM 1306 and the EM 1310 can scale up/down the quantity of VNFs of the system 1300.

The NFVO 1312 may coordinate, authorize, release and engage resources of the NFVI 1304 in order to provide the requested service (e.g., to execute an EPC function, component, or slice). The NM 1314 may provide a package of end-user functions with the responsibility for the management of a network, which may include network elements with VNFs, non-virtualized network functions, or both (management of the VNFs may occur via the EM 1310).

Figure 14:
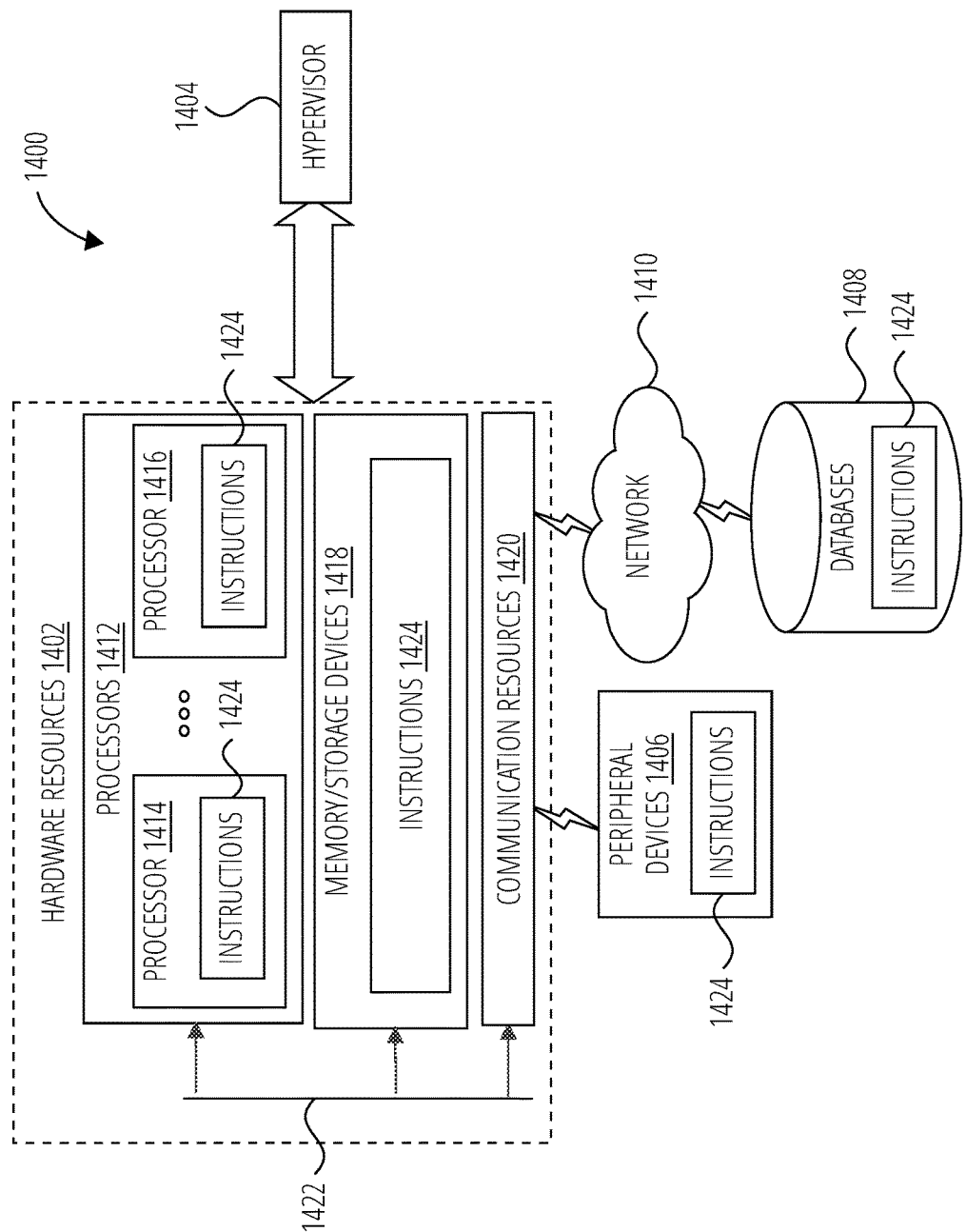
FIG. 14 illustrates components in accordance with one embodiment.

FIG. 14 is a block diagram illustrating components 1400, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1402 including one or more processors 1412 (or processor cores), one or more memory/storage devices 1418, and one or more communication resources 1420, each of which may be communicatively coupled via a bus 1422. For embodiments where node virtualization (e.g., NFV) is utilized, a hypervisor 1404 may be executed to provide an execution environment for one or more network slices/sub-slices to utilize the hardware resources 1402.

The processors 1412 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1414 and a processor 1416.

The memory/storage devices 1418 may include main memory, disk storage, or any suitable combination thereof. The memory/storage devices 1418 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1420 may include interconnection or network interface components or other suitable devices to communicate with one or more peripheral devices 1406 or one or more databases 1408 via a network 1410. For example, the communication resources 1420 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1424 may comprise software, a program, an application, an applet, an app, or other executable code for causing at least any of the processors 1412 to perform any one or more of the methodologies discussed herein. The instructions 1424 may reside, completely or partially, within at least one of the processors 1412 (e.g., within the processor's cache memory), the memory/storage devices 1418, or any suitable combination thereof. Furthermore, any portion of the instructions 1424 may be transferred to the hardware resources 1402 from any combination of the peripheral devices 1406 or the databases 1408. Accordingly, the memory of the processors 1412, the memory/storage devices 1418, the peripheral devices 1406, and the databases 1408 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 is residential gateway including a non-cellular access network and a relay UE. The non-cellular access network (AN) comprises: a non-cellular network access point (AP) to provide a trusted connection or an untrusted connection between a remote user equipment (UE) and the non-cellular access network; and a non-cellular network gateway function (GF). The relay UE to enable relay service for the remote UE to connect to a core network (CN) of a cellular communication system. The relay UE uses a first protocol data unit (PDU) session for first data traffic corresponding to the residential gateway and a second PDU session for second data traffic corresponding to the remote UE.

Example 2 is the residential gateway of Example 1, wherein the cellular communication system comprises a fifth generation (5G) communication system, the CN comprises a 5G core (5GC), the remote UE comprises a 5GC capable UE, the residential gateway comprises a 5G residential gateway (5G-RG), the non-cellular network AN comprises a non-3rd Generation Partnership Project (N3GPP)-AN, the non-cellular network AP comprises an N3GPP-AP, and the non-cellular network GF comprises a N3GPP-GF.

Example 3 is the residential gateway of Example 1, wherein for the untrusted connection: the non-cellular network AP is configured to perform a wireless wide area network (WLAN) association to establish a layer 3 (L3) transport connection with the remote UE; and the non-cellular network GF is configured to support authentication and security association for the remote UE.

Example 4 is the residential gateway of Example 1, wherein for the trusted connection: the non-cellular network AP is configured to establish a layer 2 (L2) transport connection with the remote UE; and the non-cellular network GF is configured to trigger communication with the CN using an L2 extensible authentication protocol (EAP).

Example 5 is the residential gateway of Example 1, wherein the non-cellular network GF is configured to forward non-access stratum (NAS) messages between the remote UE and the relay UE.

Example 6 is the residential gateway of Example 1, wherein the relay UE comprises a layer 3 (L3) relay configured to support an N1 connection via a radio access network (RAN) or a wireline access network for accessing to the CN of the cellular communication system.

Example 7 is the residential gateway of Example 6, wherein to relay a registration request from the remote UE to the CN, the relay UE is configured to: initiate a non-access stratum (NAS) procedure with the CN via the RAN or the wireline access network; and include the registration request in an N1 message to the CN.

Example 8 is the residential gateway of Example 7, wherein the RAN or the wireline access network forwards uplink traffic of the remote UE to a corresponding user plane function in the CN based on AN resource mapping to a quality of service (QoS) flow marked with a QoS flow identifier (QFI) of the second PDU session of the residential gateway.

Example 9 is the residential gateway of Example 1, wherein the relay UE is configured to manage the second PDU session for the remote UE, and wherein the relay UE uses a single network slice selection assistance information (S-NSSAI) and a data network name (DNN) associated with the second PDU session to relay traffic to and from the remote UE.

Example 10 is the residential gateway of Example 1, wherein the relay UE is further configured to: based on information of a single network slice selection assistance information (S-NSSAI) and a data network name (DNN), determine whether to forward a non-access stratum (NAS) message sent by the remote UE to an access and mobility management function (AMF) or to use an existing PDU session, if any are shared by one or more remote UEs, associated with the S-NSSAI and the DNN.

Example 11 is the residential gateway of Example 10, wherein a radio resource control (RRC) message used to transport a NAS PDU includes a fifth generation (5G) serving temporary mobile subscriber identity (5G-S-TMSI) of the remote UE, and wherein the relay UE uses the 5G-S-TMSI to forward the NAS message towards the AMF associated with the remote UE.

Example 12 is the residential gateway of Example 10, wherein if there is no existing PDU session associated with the S-NSSAI and the DNN that is requested by the remote UE, the relay UE is configured to: generate a first PDU session identifier (ID) that is unique within the residential gateway; and send the NAS message to the AMF associated with the remote UE, wherein the NAS message replaces a second PDU session ID generated by the remote UE with the first PDU session ID generated by the relay UE, and wherein a request type of the NAS message is set to indicate relay traffic.

Example 13 is the residential gateway of Example 10, wherein the existing PDU session associated with the S-NSSAI and the DNN is further associate with one or more application identifiers (IDs), and wherein the relay UE is further configured to select a quality of service (QoS) flow identified by a QoS flow identifier (QFI) to relay traffic for the remote UE using the existing PDU session.

Example 14 is the residential gateway of Example 13, wherein a QoS comprises the QFI and is unique within the existing PDU session, and wherein the QoS rule is either preconfigured within the residential gateway or the relay UE receives the QoS rule from a PDU session establishment, modification, and management request procedure sent from the remote UE.

Example 15 is the residential gateway of Example 13, wherein the relay UE is configured to create a remote UE connection context comprising a first PDU session ID used to relay traffic generated by the residential gateway, a second PDU session ID provided by the remote UE, a remote user context list, the one or more application IDs, the DNN, and the S-NSSAI.

Example 16 is the residential gateway of Example 15, wherein each remote user context in the remote user context list comprises a remote user ID, an address type, address information, and respective QFI for the PDU Session ID to be used for the relay traffic.

Example 17 is the residential gateway of Example 16, wherein for an internet protocol (IP) version 4 (IPv4) address type, the relay UE includes IPv4 addresses and transmission communication protocol (TCP) or user datagram protocol (UDP) assigned to individual users in the remote UE connection context, and wherein for IP version 6 (IPv6) address type, the relay UE includes IPv6 prefixes assigned to the individual remote users in the remote UE connection context.

Example 18 is a method for an access and mobility management function (AMF) in a data network. The method includes: configuring the AMF to serve a residential gateway; processing, at the AMF, a registration request to serve a remote user equipment (UE) connected to the residential gateway for relay services to the data network; determining, at the AMF, to reallocate the remote UE to a target AMF; in response to determining to reallocate the remote UE to the target AMF: generate a correlation identifier (ID) for the residential gateway to associate with one or more remote UEs; and encode a reroute non-access stratum (NAS) message comprising the correlation ID and a radio access network (RAN) ID associated with the UE.

Example 19 is the method of Example 18, wherein the residential gateway comprises a fifth generation (5G) residential gateway (5G-RG), wherein the remote UE comprises a 5GC capable UE, and wherein determining to reallocate the remote UE to the target AMF comprises: processing at least one of a 5G serving temporary mobile subscriber identity (5G-S-TMSI) and a globally unique AMF ID (GUAMI) associated with the remote UE; and determining that routing information in the S-TMSI or GUAMI is associated with an AMF region ID that is different than a region of the AMF.

Example 20 is the method of Example 18, wherein determining to reallocate the remote UE to the target AMF comprises determining that a requested single network slice selection assistance information (S-NSSAI) of the remote UE is different from an allowed NSSAI of the residential gateway.

Example 21 is the method of Example 18, wherein determining to reallocate the remote UE to the target AMF comprises determining that a serving public land mobile network (PLMN) or a home PLMN (HPLMN) of the remote UE is different than a serving PLMN or HPLMN of the residential gateway.

Example 22 is the method of Example 18, wherein to reallocate the remote UE to the target AMF further comprises sending the reroute NAS message directly to the target AMF and invoking a message notify service operation to the target AMF comprising a radio access network (RAN) UE next generation application protocol layer (NGAP) ID of the remote UE to enable a RAN or a wireline access network to identify an N2 termination point.

Example 23 is the method of Example 18, wherein to reallocate the remote UE to the target AMF further comprises sending the reroute NAS message to the target AMF via a radio access network (RAN) or a wireline access network.

Example 24 is the method of Example 21, wherein the reroute NAS message to the target AMF further comprises at least one of: a RAN UE next generation application protocol layer (NGAP) ID of the remote UE; allowed network slice selection assistance information (NSSAI) of the remote UE, an AMF region ID, and an AMF set ID for the remote UE.

Example 25 is a non-transitory computer-readable storage medium including instructions that, when processed by a processor, configure the processor to perform the method of any of Example 18 to Example 24.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for an access and mobility management function (AMF) in a data network, the method comprising:
configuring the AMF to serve a residential gateway;
processing, at the AMF, a registration request to serve a remote user equipment (UE) connected to the residential gateway for relay services to the data network;
determining, at the AMF, to reallocate the remote UE to a target AMF; and
in response to determining to reallocate the remote UE to the target AMF:
generating a correlation identifier (ID) for the residential gateway to associate with the remote UE; and
encoding a reroute non-access stratum (NAS) message comprising the correlation ID and a radio access network (RAN) ID associated with the remote UE.

2. The method of claim 1, wherein the residential gateway comprises a fifth generation (5G) residential gateway (5G-RG), wherein the remote UE comprises a 5GC capable UE, and wherein determining to reallocate the remote UE to the target AMF comprises:
processing at least one of a 5G serving temporary mobile subscriber identity (5G-S-TMSI) and a globally unique AMF ID (GUAMI) associated with the remote UE; and
determining that routing information in the 5G-S-TMSI or the GUAMI is associated with an AMF region ID that is different than a region of the AMF.

3. The method of claim 1, wherein determining to reallocate the remote UE to the target AMF comprises determining that a requested single network slice selection assistance information (S-NSSAI) of the remote UE is different from an allowed NSSAI of the residential gateway.

4. The method of claim 1, wherein determining to reallocate the remote UE to the target AMF comprises determining that a serving public land mobile network (PLMN) or a home PLMN (HPLMN) of the remote UE is different than a serving PLMN or HPLMN of the residential gateway.

5. The method of claim 1, wherein to reallocate the remote UE to the target AMF further comprises sending the reroute NAS message directly to the target AMF and invoking a message notify service operation to the target AMF comprising a RAN UE next generation application protocol layer (NGAP) ID of the remote UE to enable a RAN or a wireline access network to identify an N2 termination point.

6. The method of claim 1, wherein to reallocate the remote UE to the target AMF further comprises sending the reroute NAS message to the target AMF via a RAN or a wireline access network.

7. The method of claim 1, wherein the reroute NAS message to the target AMF further comprises at least one of: a RAN UE next generation application protocol layer (NGAP) ID of the remote UE; allowed network slice selection assistance information (NSSAI) of the remote UE, an AMF region ID, and an AMF set ID for the remote UE.

8. An apparatus for an access and mobility management function (AMF) in a data network, the apparatus comprising:
one or more processors configured to:
configure the AMF to serve a residential gateway;
process, at the AMF, a registration request to serve a remote user equipment (UE) connected to the residential gateway for relay services to the data network;
determine, at the AMF, to reallocate the remote UE to a target AMF; and
in response to determining to reallocate the remote UE to the target AMF:
generate a correlation identifier (ID) for the residential gateway to associate with the remote UE; and
encode a reroute non-access stratum (NAS) message comprising the correlation ID and a radio access network (RAN) ID associated with the remote UE.

9. The apparatus of claim 8, wherein the residential gateway comprises a fifth generation (5G) residential gateway (5G-RG), wherein the remote UE comprises a 5GC capable UE, and wherein to determine to reallocate the remote UE to the target AMF, the one or more processors are further configured to:
process at least one of a 5G serving temporary mobile subscriber identity (5G-S-TMSI) and a globally unique AMF ID (GUAMI) associated with the remote UE; and
determine that routing information in the 5G-S-TMSI or the GUAMI is associated with an AMF region ID that is different than a region of the AMF.

10. The apparatus of claim 8, wherein to determine to reallocate the remote UE to the target AMF, the one or more processors are further configured to determine that a requested single network slice selection assistance information (S-NSSAI) of the remote UE is different from an allowed NSSAI of the residential gateway.

11. The apparatus of claim 8, wherein to determine to reallocate the remote UE to the target AMF, the one or more processors are further configured to determine that a serving public land mobile network (PLMN) or a home PLMN (HPLMN) of the remote UE is different than a serving PLMN or HPLMN of the residential gateway.

12. The apparatus of claim 8, wherein to reallocate the remote UE to the target AMF, the one or more processors are further configured to send the reroute NAS message directly to the target AMF and invoke a message notify service operation to the target AMF comprising a RAN UE next generation application protocol layer (NGAP) ID of the remote UE to enable a RAN or a wireline access network to identify an N2 termination point.

13. The apparatus of claim 8, wherein to reallocate the remote UE to the target AMF, the one or more processors are further configured to send the reroute NAS message to the target AMF via a RAN or a wireline access network.

14. The apparatus of claim 8, wherein the reroute NAS message to the target AMF further comprises at least one of: a RAN UE next generation application protocol layer (NGAP) ID of the remote UE; allowed network slice selection assistance information (NSSAI) of the remote UE, an AMF region ID, and an AMF set ID for the remote UE.

15. At least one non-transitory machine readable storage medium comprising instructions embodied thereon that, when executed by one or more processors of an access and mobility management function (AMF) in a data network, to perform a method comprising:
configuring the AMF to serve a residential gateway;
processing, at the AMF, a registration request to serve a remote user equipment (UE) connected to the residential gateway for relay services to the data network;
determining, at the AMF, to reallocate the remote UE to a target AMF; and
in response to determining to reallocate the remote UE to the target AMF:
generating a correlation identifier (ID) for the residential gateway to associate with the remote UE; and
encoding a reroute non-access stratum (NAS) message comprising the correlation ID and a radio access network (RAN) ID associated with the remote UE.

16. The at least one non-transitory machine readable storage medium of claim 15, wherein the residential gateway comprises a fifth generation (5G) residential gateway (5G-RG), wherein the remote UE comprises a 5GC capable UE, and wherein determining to reallocate the remote UE to the target AMF comprises:
processing at least one of a 5G serving temporary mobile subscriber identity (5G-S-TMSI) and a globally unique AMF ID (GUAMI) associated with the remote UE; and
determining that routing information in the 5G-S-TMSI or the GUAMI is associated with an AMF region ID that is different than a region of the AMF.

17. The at least one non-transitory machine readable storage medium of claim 15, wherein determining to reallocate the remote UE to the target AMF comprises determining that a requested single network slice selection assistance information (S-NSSAI) of the remote UE is different from an allowed NSSAI of the residential gateway.

18. The at least one non-transitory machine readable storage medium of claim 15, wherein determining to reallocate the remote UE to the target AMF comprises determining that a serving public land mobile network (PLMN) or a home PLMN (HPLMN) of the remote UE is different than a serving PLMN or HPLMN of the residential gateway.

19. The at least one non-transitory machine readable storage medium of claim 15, wherein to reallocate the remote UE to the target AMF further comprises sending the reroute NAS message directly to the target AMF and invoking a message notify service operation to the target AMF comprising a RAN UE next generation application protocol layer (NGAP) ID of the remote UE to enable a RAN or a wireline access network to identify an N2 termination point.

20. The at least one non-transitory machine readable storage medium of claim 15, wherein to reallocate the remote UE to the target AMF further comprises sending the reroute NAS message to the target AMF via a RAN or a wireline access network.

* * * * *